(12) United States Patent
Akimoto et al.

(10) Patent No.: US 9,235,999 B2
(45) Date of Patent: Jan. 12, 2016

(54) PIXEL CIRCUITS AND METHODS FOR DISPLAYING AN IMAGE ON A DISPLAY DEVICE

(71) Applicant: Pixtronix, Inc., San Diego, CA (US)

(72) Inventors: Hajime Akimoto, Kokubunji (JP);
Takahiko Muneyoshi, Chiba (JP);
Kenta Kajiyama, Yotsukaido (JP)

(73) Assignee: Pixtronix, Inc., San Diego, CA (US)

( * ) Notice: Subject to any disclaimer, the term of this patent is extended or adjusted under 35 U.S.C. 154(b) by 105 days.

(21) Appl. No.: 13/726,279

(22) Filed: Dec. 24, 2012

(65) Prior Publication Data

US 2013/0162621 A1 Jun. 27, 2013

(30) Foreign Application Priority Data

Dec. 26, 2011 (JP) ................................. 2011-282643

(51) Int. Cl.
*G09G 1/00* (2006.01)
*G09G 3/34* (2006.01)
(Continued)

(52) U.S. Cl.
CPC .............. *G09G 1/005* (2013.01); *G02B 26/023* (2013.01); *G09G 3/3433* (2013.01); *G02B 26/0841* (2013.01); *G09G 2300/08* (2013.01); *G09G 2300/0857* (2013.01); *G09G 2310/06* (2013.01)

(58) Field of Classification Search
CPC .................. H01L 27/14609; H01L 27/14612; G09G 2310/0262; G09G 3/3433; G09G 2300/08; G09G 3/3406; G09G 2300/0473; G09G 1/005; G09G 2300/0857; G09G 2310/06; G02B 26/023; G02B 26/0841

USPC .............. 345/31, 85, 108–109; 359/227, 230, 359/236, 578, 196.1–197.1, FOR. 100; 348/56, 296, 367, E5.037
See application file for complete search history.

(56) References Cited

U.S. PATENT DOCUMENTS 5,444,566 A 8/1995 Gale et al.
7,839,356 B2 11/2010 Hagood et al.
(Continued)

FOREIGN PATENT DOCUMENTS

CN 1886896 A 12/2006
GB 2459661 A 11/2009
(Continued)

OTHER PUBLICATIONS

European Search Report—EP12199516—Search Authority—The Hague—Oct. 28, 2014.

(Continued)

*Primary Examiner* — Lun-Yi Lao
*Assistant Examiner* — Elliott Deaderick
(74) *Attorney, Agent, or Firm* — Edward A. Gordon; Foley & Lardner LLP

(57) ABSTRACT

A display device includes a plurality of pixels each including a mechanical shutter. The display device electrically controls the position of the mechanical shutter to provide image display. Each of the pixels includes a pixel circuit for electrically controlling the position of the mechanical shutter. The pixel circuit includes a first control electrode and a second control electrode provided as a pair with respect to the mechanical shutter; a first mean for applying a prescribed control voltage to the first control electrode and the second control electrode to put the mechanical shutter and the first control electrode or the second control electrode into contact with each other; and a second mean for, in a state where the mechanical shutter is at a stop, decreasing a potential difference between the mechanical shutter and the first control electrode or the second control electrode which is in contact with the mechanical shutter.

16 Claims, 16 Drawing Sheets

(51) Int. Cl.
   *G02B 26/02* (2006.01)
   *G02B 26/08* (2006.01)

(56) References Cited

U.S. PATENT DOCUMENTS

| | | |
|---|---|---|
| 2002/0051096 A1 | 5/2002 | Yamazaki et al. |
| 2005/0212734 A1 | 9/2005 | Kimura |
| 2005/0219676 A1 | 10/2005 | Kimura et al. |
| 2006/0250325 A1* | 11/2006 | Hagood et al. .................. 345/55 |
| 2007/0002156 A1* | 1/2007 | Hagood et al. ................ 348/296 |
| 2008/0129681 A1* | 6/2008 | Hagood et al. ................ 345/109 |
| 2008/0174532 A1 | 7/2008 | Lewis |
| 2009/0103164 A1 | 4/2009 | Fijol et al. |
| 2011/0122474 A1* | 5/2011 | Payne et al. .................. 359/230 |
| 2011/0164067 A1 | 7/2011 | Lewis et al. |
| 2012/0026205 A1 | 2/2012 | Yoon et al. |
| 2012/0154455 A1* | 6/2012 | Steyn et al. .................. 345/690 |
| 2012/0306562 A1* | 12/2012 | Miyamoto et al. ........... 327/434 |
| 2012/0306842 A1* | 12/2012 | Miyazawa et al. ............ 345/212 |

FOREIGN PATENT DOCUMENTS

| | | |
|---|---|---|
| JP | H11174428 A | 7/1999 |
| JP | 2001281563 A | 10/2001 |
| JP | 2003015123 A | 1/2003 |
| KR | 20100027827 A | 3/2010 |
| WO | 2006091738 A1 | 8/2006 |

OTHER PUBLICATIONS

Taiwan Search Report—TW101146743—TIPO—Aug. 26, 2014.

* cited by examiner

PIXEL CIRCUITS AND METHODS FOR DISPLAYING AN IMAGE ON A DISPLAY DEVICE

CROSS-REFERENCE TO RELATED APPLICATIONS

This application is based upon and claims the benefit of priority from the prior Japanese Patent Application No. 2011-282643, filed on Dec. 26, 2011, the entire contents of which are incorporated herein by reference.

FIELD

The present invention relates to a display device and a method for driving the same, and specifically to a technology effectively applicable to a pixel circuit of an image display device for electrically controlling the position of a mechanical shutter to provide image display.

BACKGROUND

A method of using an image display device for electrically controlling the position of a mechanical shutter to provide image display (hereinafter, referred to as a "movable shutter-type image display device") is described in US 2008/0174532.

FIG. 16 is a circuit diagram showing a pixel circuit of a conventional movable shutter-type image display device.

Hereinafter, the conventional movable shutter-type image display device will be described with reference to FIG. 16.

Each pixel circuit 213 includes a signal line 206. The signal line 206 and a signal storage capacitance 204 are connected to each other by a signal transfer switch 205.

The signal storage capacitance 204 is also connected to a gate of an n-type MOS transistor 203 for shutter negative voltage write. A drain of the n-type MOS transistor 203 for shutter negative voltage write is connected to a drain of a p-type MOS transistor 202 for shutter positive voltage write via a cascode n-type MOS transistor 216 and a cascode p-type MOS transistor 215.

Each pixel includes a dual actuator shutter assembly 201 connected to a shutter voltage line 211. One of two control electrodes of the dual actuator shutter assembly 201 is connected to the drain of the n-type MOS transistor 203 for shutter negative voltage write via the cascode n-type MOS transistor 216. The other control electrode is connected to a control electrode voltage line 209.

The other end of the signal storage capacitance 204 is connected to the shutter voltage line 211. A source of the n-type MOS transistor 203 for shutter negative voltage write is connected to an nMOS source voltage line 212 for shutter negative voltage write.

A gate and the drain of the p-type MOS transistor 202 for shutter positive voltage write are respectively connected to a pMOS gate voltage line 207 for shutter positive voltage write and a positive voltage line 208. A gate of the cascode n-type MOS transistor 216 and a gate of the cascode p-type MOS transistor 215 are connected to a cascode gate voltage line 217. A gate of the signal transfer switch 205 is connected to a scanning line 210.

The dual actuator shutter assembly 201 is provided to face an opening in a light blocking surface. This image display device includes a plurality of such pixel circuits 213 arrayed in a matrix.

Now, an operation of the conventional movable shutter-type image display device will be described.

An image signal voltage written to the signal line 206 is stored on the signal storage capacitance 204 via the signal transfer switch 205 by scanning the scanning lines 210 sequentially.

Then, after the scanning operation for writing an image signal voltage on the signal storage capacitances 204 of all the pixels is finished, each pixel performs amplified write of an image signal to one of the control electrodes of the dual actuator shutter assembly 201, based on the written image signal voltage. Namely, in all the pixels, the pMOS gate voltage line 207 for shutter positive voltage write is put into a low voltage state for a prescribed time period, so that the p-type MOS transistor 202 for shutter positive voltage write is put into an ON state for this period. Thus, one of the control electrodes of the dual actuator shutter assembly 201 is precharged with a prescribed positive voltage, which has been applied to the positive voltage line 208.

Next, the nMOS source voltage line 212 for shutter negative voltage write is put into a low voltage state for a prescribed time period. For this period, only in a pixel which includes the signal storage capacitance 204 having a high voltage as an image signal voltage written therein, the n-type MOS transistor 203 for shutter negative voltage write is put into an ON state. As a result, the voltage of one of the control electrodes of the dual actuator shutter assembly 201 is re-rewritten with a prescribed low voltage applied to the nMOS source voltage line 212 for shutter negative voltage write.

In a pixel which includes the signal storage capacitance 204 having a low voltage as an image signal voltage written therein, the n-type MOS transistor 203 for shutter negative voltage write is kept in an OFF state for the above-mentioned period. Therefore, the voltage of one of the control electrodes of the dual actuator shutter assembly 201 is kept in the state of being precharged at the prescribed positive voltage.

In this manner, amplified write of an image signal is performed on one of the control electrodes of the dual actuator shutter assembly 201. In parallel with this, a voltage applied to the control electrode voltage line 209 is controlled, so that the dual actuator shutter assembly 201 can be electrostatically operated to be opened or closed. The opening provided in the light blocking surface of the dual actuator shutter assembly 201 is opened or closed in this manner, so that the amount of transmitted light is controlled. Thus, the image display device can display an image corresponding to the written image signal voltage on the pixel matrix.

In the above-described operation, the cascode n-type MOS transistor 216 and the cascode p-type MOS transistor 215 are provided in order to protect the p-type MOS transistor 202 for shutter positive voltage write and the n-type MOS transistor 203 for shutter negative voltage write against write of a high drain voltage which may spoil the reliability life thereof.

It was found that in a movable shutter-type image display device, a control fault of a mechanical shutter which reduces the life of the device is caused by an adhesive force caused between the shutter electrode and the control electrode.

This will be described with reference to FIG. 6. FIG. 6 provides schematic views of a shutter electrode 20 and a control electrode 21 provided in each of pixels in a movable shutter-type image display device. An insulating film 50 of alumina or silicon nitride is provided around the electrodes.

FIG. 6(a) shows that the shutter electrode 20 is electrostatically attracted to the control electrode 21. A voltage of, for example, 25V is applied between the electrodes. At this point, a prescribed electric field is generated in the insulating film 50 located between the electrodes, and thus a leak current is generated due to Poole-Frankel or Fowler-Nordheim injection current.

Which of the current injection mechanisms mainly acts is determined by the quality of the film, electric field, temperature or the like. For example, in the case where the shutter electrode 20 is supplied with a negative voltage and the control electrode 21 is supplied with a positive voltage, the generated leak current is defined as electron injection directed from the shutter electrode 20 toward the control electrode 21. It should be noted that the insulating film 50 located between the electrodes has a contact interface and a great number of electron trap levels are existent around the contact interface.

Electrons released from the insulating film 50 on the shutter electrode 20 side are concentrated in tiny convexed portions on the insulating film, and therefore the influence of the electron trap is small. By contrast, on the control electrode 21 side, injected electrons are dispersed in a large area of the interface of the insulating film 50, and therefore a great number of electrons are trapped at the electron trap levels. This is shown in FIG. 6(b).

FIG. 6(c) shows a state where no voltage is applied between the electrodes after the state of FIG. 6(b). Even when there is no voltage applied anymore, electrons, once trapped, stay at the interface of the insulating film 50 for a relatively long period. Even when a negative electrode is kept applied to the shutter electrode 20 and a positive electrode is kept applied to the control electrode 21 in order to close the electrodes, the residual charges decrease the potential of the positive electrode. As a result, the control on the shutter performed by use of electrostatic attraction is destabilized. As a result, the life of the mechanical shutter or the life of the display device may be reduced.

The present invention for solving these problems of the conventional art has an object of providing a technology capable of, in a movable shutter-type image display device, significantly decreasing the amount of trapped electrons (charges) caused by a leak current to alleviate the control fault of the mechanical shutter and thus to significantly extend the life of the display.

The foregoing and the other objects and novel features of the present invention will be made clear by the description in this specification and the attached drawings.

SUMMARY

Representative subject matter of the invention disclosed in this application is as follows.

In order to solve the above-described problems, the present invention is directed to a display device, comprising a plurality of pixels each including a mechanical shutter, the display device electrically controlling the position of the mechanical shutter to provide image display, wherein each of the pixels includes a pixel circuit for electrically controlling the position of the mechanical shutter; and the pixel circuit includes a first control electrode and a second control electrode provided as a pair with respect to the mechanical shutter; a first mean for applying a prescribed control voltage to the first control electrode and the second control electrode to put the mechanical shutter and the first control electrode or the second control electrode into contact with each other; and a second mean for, in a state where the mechanical shutter is at a stop, decreasing a potential difference between the mechanical shutter and the first control electrode or the second control electrode which is in contact with the mechanical shutter.

The present invention is also directed to a display device, comprising a plurality of pixels each including a mechanical shutter, the display device electrically controlling the position of the mechanical shutter to provide image display, wherein each of the pixels includes a pixel circuit for electrically controlling the position of the mechanical shutter; and the pixel circuit includes a first control electrode and a second control electrode provided as a pair with respect to the mechanical shutter; a first mean for applying a prescribed control voltage to the first control electrode and the second control electrode to put the mechanical shutter and the first control electrode or the second control electrode into contact with each other; and a second mean for, in a state where the mechanical shutter is at a stop, decreasing a potential difference between the mechanical shutter and the second control electrode which is in contact with the mechanical shutter.

DESCRIPTION OF EMBODIMENTS

Figure 1:
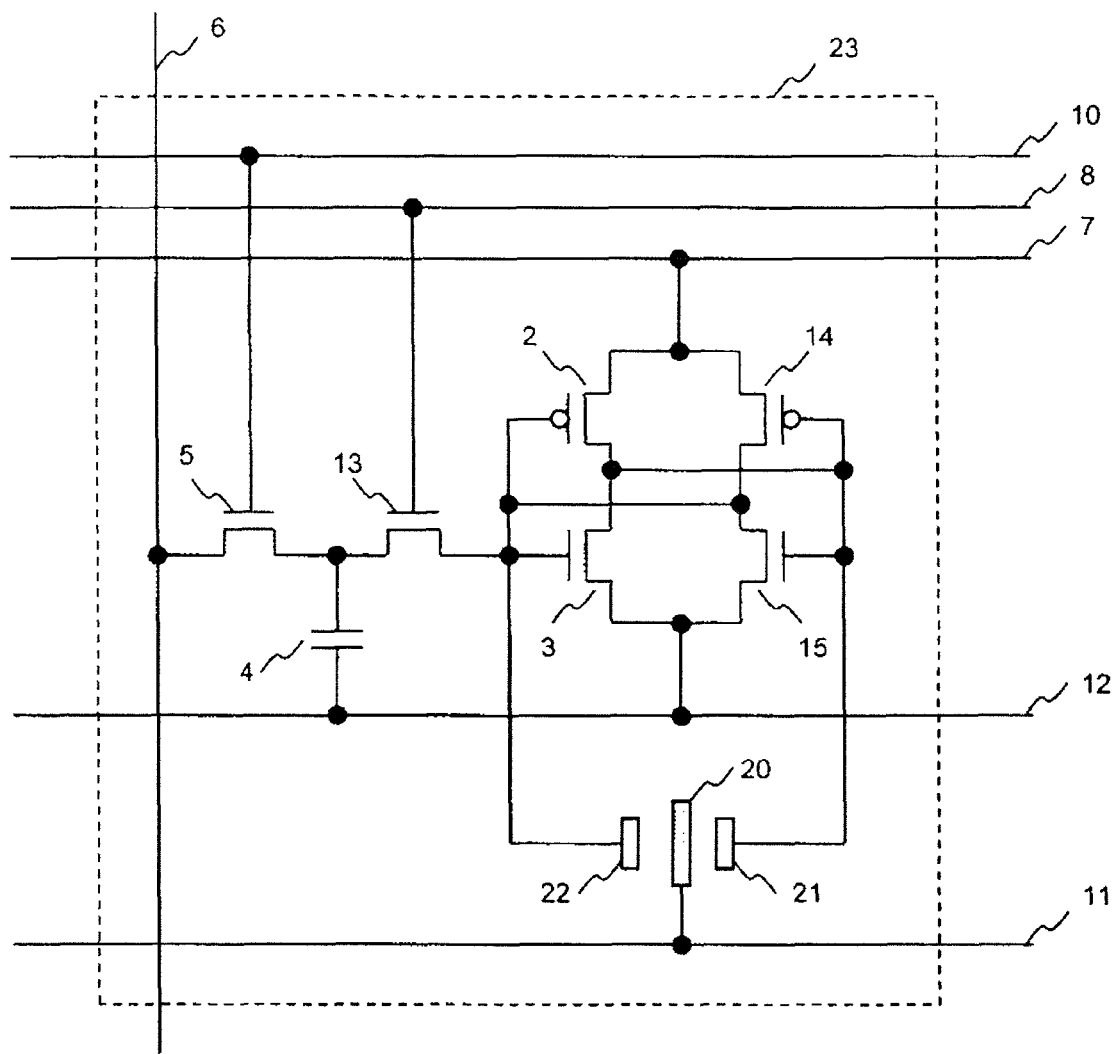
FIG. 1 is a circuit diagram showing a pixel circuit of a movable shutter-type image display device in Example 1 according to the present invention.

Hereinafter, examples of the present invention will be described with reference to the drawings.

In the drawings provided to explain the examples, elements having identical functions will bear identical reference numerals, and the same descriptions will be omitted. The following examples do not limit the scope or interpretation of the claims of the present invention.

EXAMPLE 1

FIG. 1 is a circuit diagram showing a pixel circuit of a movable shutter-type image display device in Example 1 according to the present invention.

A pixel circuit 23 in this example is a CMOS circuit, and includes p-type MOS transistors 2 and 14 connected between a power supply line 7 supplied with a VDD voltage and a power supply line 12 supplied with a GND voltage, and n-type MOS transistors 3 and 15.

Each pixel circuit 23 includes a signal line 6, and the signal line 6 and a signal storage capacitance (hereinafter, referred to as a "storage capacitance") 4 are connected to each to other by a signal transfer switch (input transistor according to the present invention) 5, which is an n-type MOS transistor.

The storage capacitance 4 is also connected to a source (or a drain) of a signal transfer switch (transfer transistor) according to the present invention) 13, which is an n-type MOS transistor. The drain (or the source) of the signal transfer switch 13 is connected to a gate of the p-type MOS transistor 2 and a gate of the n-type MOS transistor 3. The other end of the storage capacitance 4 is connected to the power supply line 12, and a gate of the signal transfer switch 5 is connected to an update line 8.

The gate of the p-type MOS transistors 2 and the gate of the n-type MOS transistor 3 are connected to one of control electrodes 22 of a mechanical shutter, and a gate of the p-type MOS transistor 14 and a gate of the n-type MOS transistor 15 are connected to the other control electrode of the mechanical shutter. The shutter electrode 20 is connected to a shutter voltage line 11.

As described later with reference to FIG. 3, the mechanical shutter is provided to face an opening in a light blocking surface.

Figure 2:
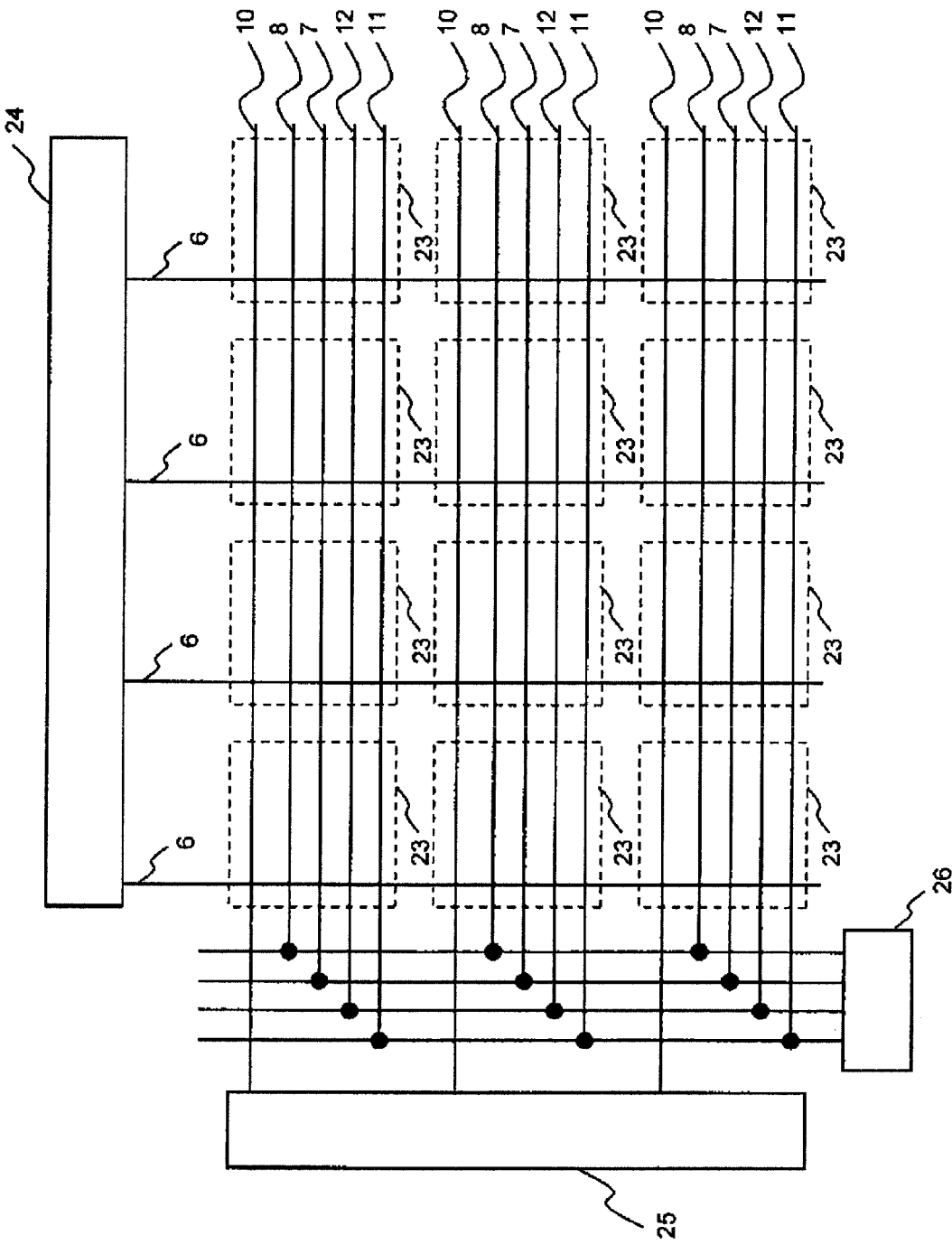
FIG. 2 is a block diagram showing a schematic structure of the movable shutter-type image display device in Example 1 according to the present invention.

FIG. 2 is a block diagram showing a schematic structure of the movable shutter-type image display device in Example 1 according to the present invention.

In the movable shutter-type image display device shown in FIG. 2, a plurality of the pixel circuits 23 shown in FIG. 1 are arrayed two-dimensionally, and each pixel circuit 23 acts as a pixel. A scanning line 10 is provided for each row and is connected to a scanning circuit 25.

The signal line 6 is provided for each column and is connected to an image signal voltage write circuit 24. The power supply lines 7 and 12, the update line 8, and the shutter voltage line 11 are provided commonly to the pixels, and are connected to a control electrode driving circuit 26.

FIG. 2 shows a display area as including the pixels in a matrix of 4×3 for the sake of simplicity, but obviously, the technological philosophy of the present invention does not specifically limit the number of pixels.

Now, a cross-sectional structure of a pixel area of the movable shutter-type image display device in this example will be described.

Figure 3:
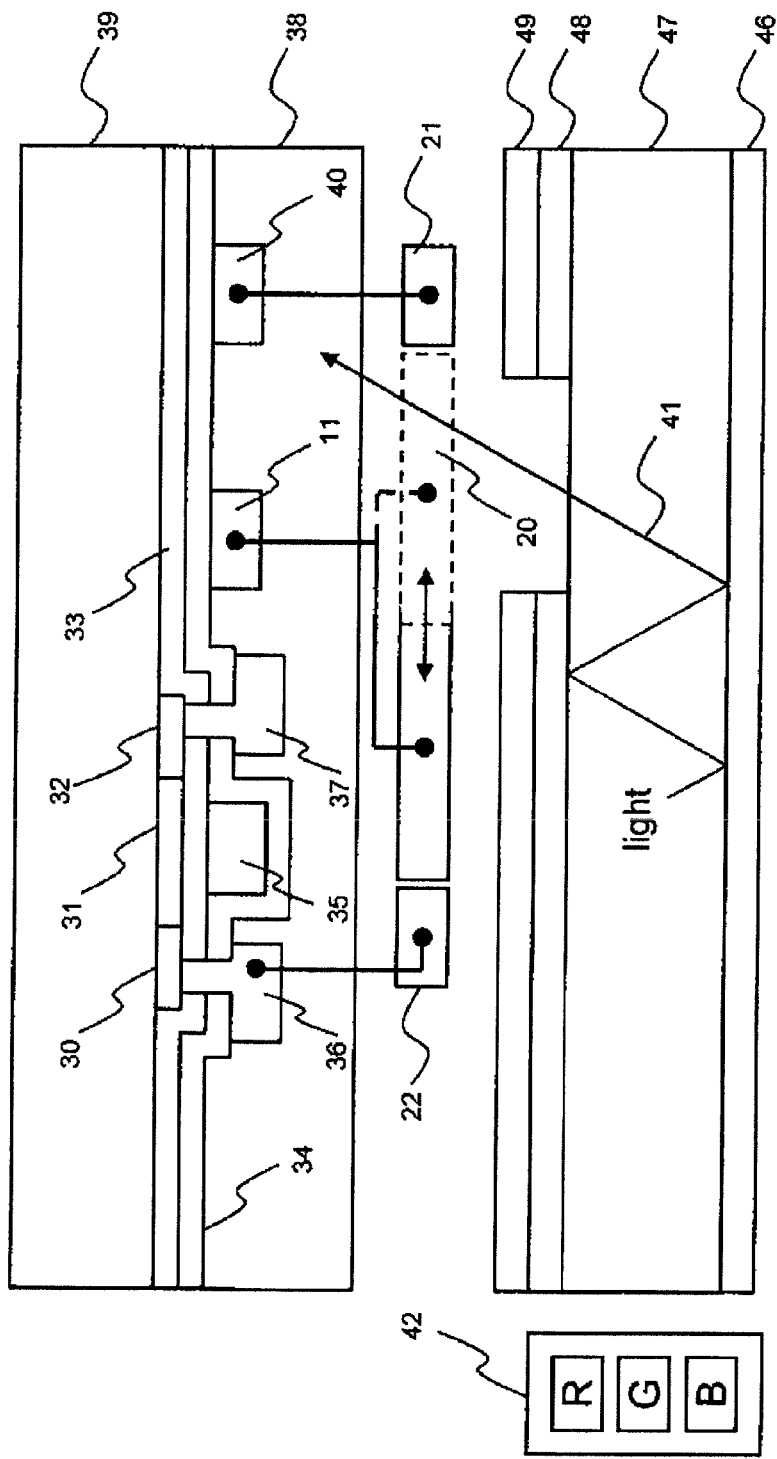
FIG. 3 is a cross-sectional view showing a cross-sectional structure of a pixel area of the movable shutter-type image display device in Example 1 according to the present invention.

FIG. 3 is a cross-sectional view showing a cross-sectional structure of the pixel area of the movable shutter-type image display device in Example 1 according to the present invention.

As shown in FIG. 3, a polycrystalline silicon thin film transistor is provided on a glass substrate 39. The polycrystalline silicon thin film transistor includes a polycrystalline silicon thin film 31, polycrystalline silicon thin films 30 and 32 doped with a high concentration n-type impurity, a gate insulating film 33, and a gate electrode 35, a source electrode 37 and a drain electrode 36 which are formed of a high melting point metal material.

The following elements are further provided on the glass substrate 39 while an insulating protective film 34 is held between the above-mentioned elements and the following elements: a shutter voltage line 11 and a drain electrode 40 (e.g., drain of the n-type MOS transistor 15) which are formed of Al like the source electrode 37 and the drain electrode 36. These elements are covered with a protective film 38 including a plurality of layers of silicon nitride and an organic material.

On the protective film 38, a dual actuator shutter assembly 1 including the shutter electrode 20 and control electrodes 21 and 22 is provided. The shutter electrode 20 is connected to the shutter voltage line 11, the drain electrode 36 is connected to the control electrode 22, and the drain electrode 40 is connected to the control electrode 21, via respective contact holes. The shutter electrode 20 and the two control electrodes 21 and 22 are covered with an insulating film so as not to be short-circuited when contacting each other.

The position of the shutter electrode 20 is controlled by an electric field which is varied by the relationship between the voltage applied to the shutter electrode 20 and the voltage applied to the control electrodes 20 and 21. For this reason, FIG. 3 also shows the movable range of the shutter electrode 20.

Although not shown in FIG. 3, other transistors provided in the pixel circuit 23 are also polycrystalline silicon thin film transistors. These polycrystalline silicon thin film transistors can be produced by use of a known excimer laser annealing process or the like.

At a position facing the glass substrate 39 with the shutter electrode 20 located therebetween, a light guide plate 47 including a light source 42 is provided. The light source 42 includes independent LED light sources of three colors of R (red), G (green) and B (blue).

On both of two surfaces of the light guide plate 47, reflective films 46 and 48 are provided respectively, and a black film 49 is provided on the reflective film 48. The reflective films 46 and 48 are metal films of Ag, Al or the like. The black film 49 may be formed of a metal oxide film, a polyimide resin or the like which has pigment particles of carbon black, titanium black or the like dispersed therein appropriately.

As shown in FIG. 3, the reflective film 48 and the black film 49 have an opening at a position corresponding to the shutter electrode 20. A part of light 41 emitted from the light source 42 and propagated in the light guide plate 47 is output through the opening. The black film 49 is provided in order to prevent reflection of external light.

Now, with reference to FIG. 4 and FIG. 5, an operation of the movable shutter-type image display device in this example will be described.

Figure 4:
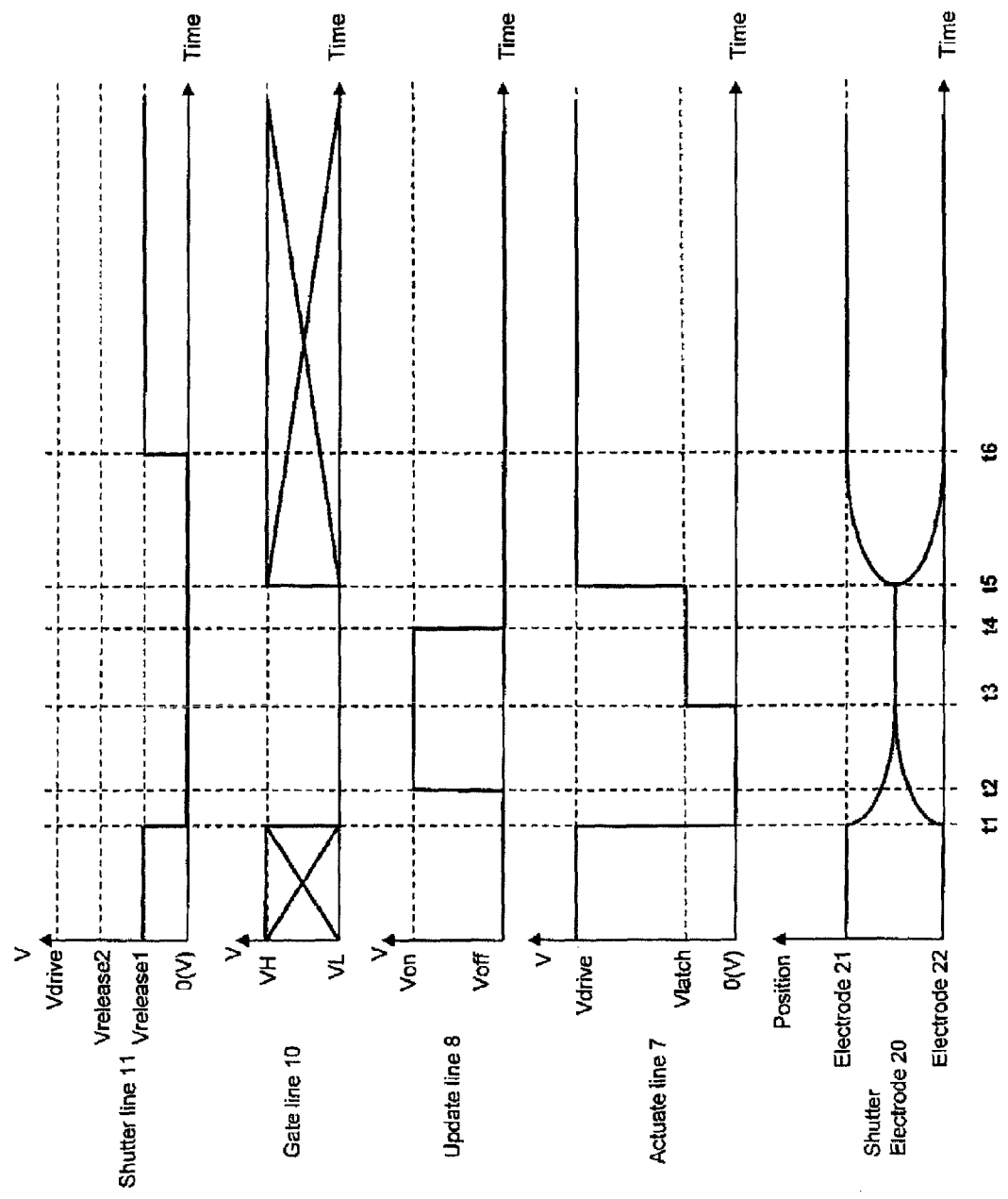
FIG. 4 is an operation timing diagram of the movable shutter-type image display device in Example 1 according to the present invention (polarity inversion: shutter=low voltage).
Figure 5:
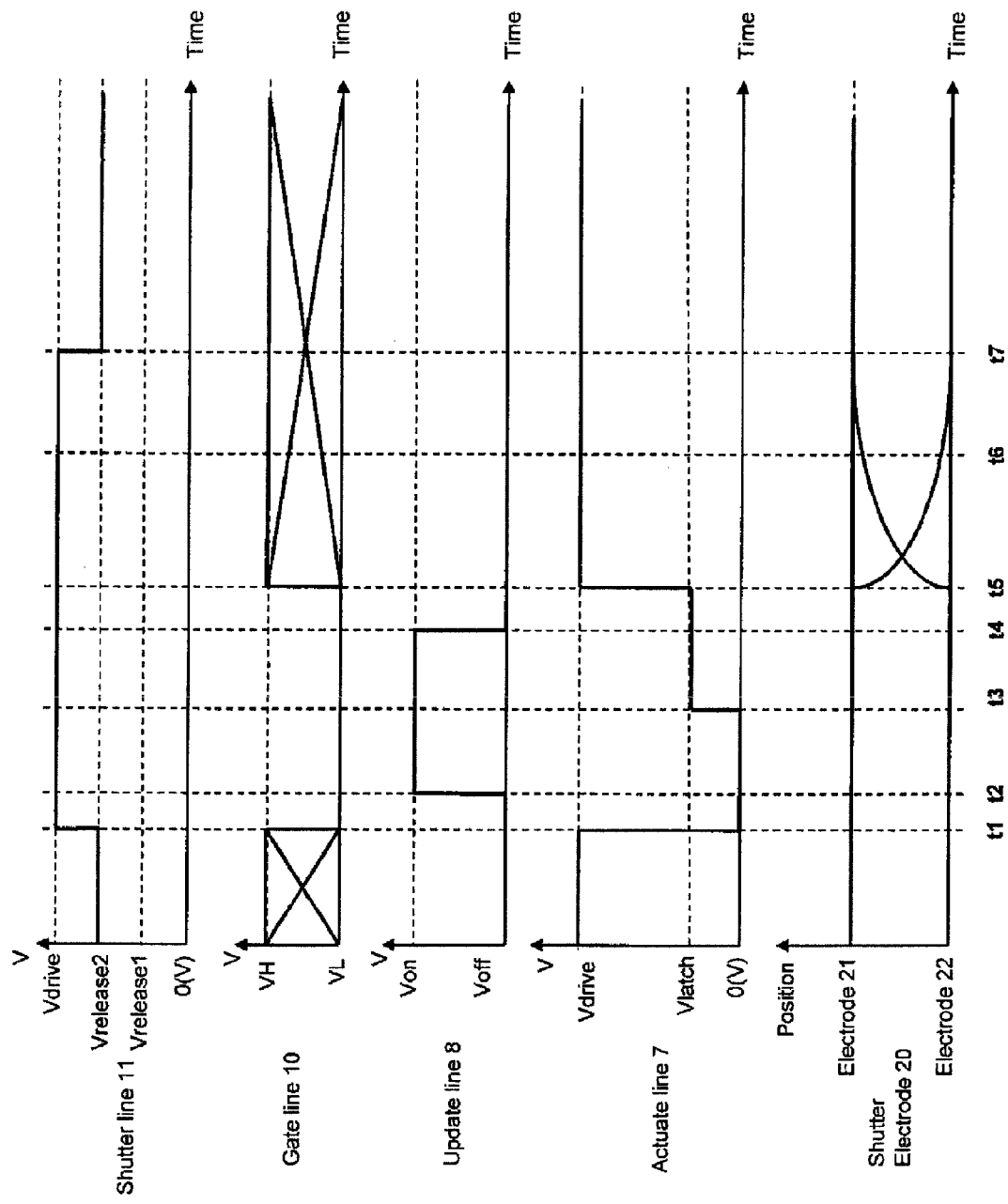
FIG. 5 is an operation timing diagram of the movable shutter-type image display device in Example 1 according to the present invention (polarity inversion: shutter=high voltage).
Figure 6:
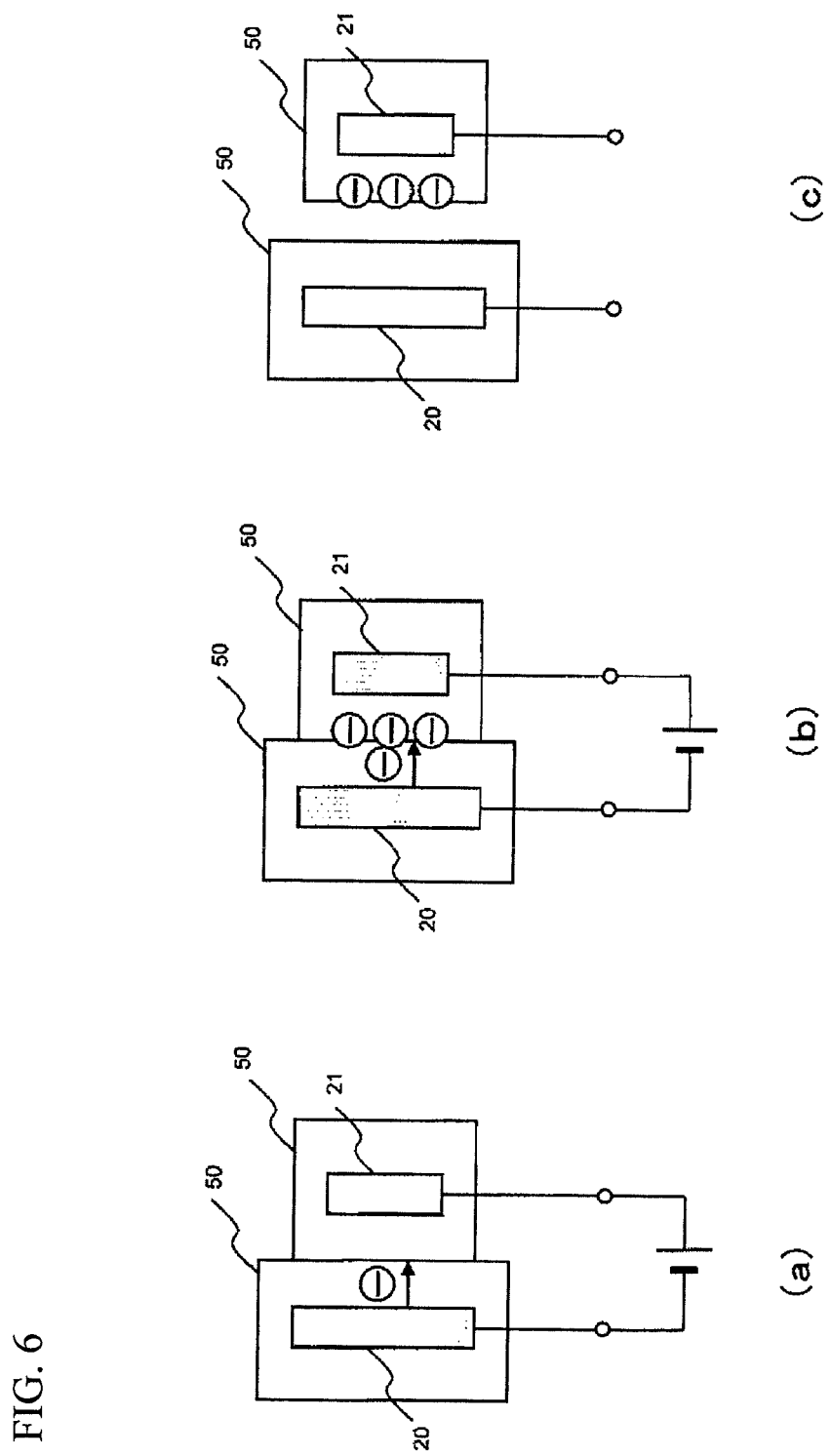
FIG. 6 is a schematic view of a shutter electrode and a control electrode provided in each of pixels of a movable shutter-type image display device.

FIG. 4 and FIG. 5 are each an operation timing diagram of the movable shutter-type image display device in this example according to the present invention. In FIG. 4 and FIG. 5, regarding a shutter control voltage on the shutter voltage line (shutter line) 11, a scanning voltage on the scanning line (gate line) 10, a transfer control signal on the update line 8, and a power supply voltage on the power supply line (actuate line) 7, the horizontal axis represents the time and the vertical axis represents the level of the voltage. Regarding the shutter electrode 20 at the bottom, FIG. 4 and FIG. 5 show the position of the shutter electrode 20 with respect to the control electrodes 21 and 22.

The shutter voltage line 11 has a voltage of 0V in FIG. 4 and has a high Vdrive voltage (e.g., 25V) in FIG. 5. This corresponds to an inversion (polarity inversion) operation of the driving voltage of the mechanical shutter.

The image display device in this example represents full-color 8-bit gradation by an opened/closed state of the shutter. For realizing this, the following PMW (Pulse Width Modulation) driving is performed. One frame is divided into at least 24 (=8×RGB) frames, and light emission from the light source 42 is time-weighted for each sub frame. The light emission to the outside is controlled by opening or closing the shutter electrode 20. During the driving, polarity inversion driving is performed at an interval of a prescribed number of sub frames in order to avoid deterioration of the electrodes of the mechanical shutter.

First, with reference to FIG. 4, an operation of the pixel circuit of the movable shutter-type image display device in this example in the state of "polarity inversion: shutter=low voltage" will be described.

Until time t1, the scanning line 10 is sequentially supplied with scanning voltages and an image signal is written in the storage capacitance 4.

Next, at time t1, the power supply voltage on the power supply line 7 becomes from a level of Vdrive (e.g., 25V) to 0V, and the shutter control voltage on the shutter voltage line 11 becomes from a level of Vrelease1 (e.g., 10V) to 0V.

Next, at time t2, the transfer control signal on the update line 8 becomes High (hereinafter, referred to as "H level"), and thus the signal transfer switch 13 is turned ON. As a result, a signal is input to an SRAM circuit formed of the p-type MOS transistors 2 and 14 and the n-type MOS transistors 3 and 15.

At time t3, the power supply voltage of the power supply line 7 is raised to a level of Vlatch, and thus an image signal is latched by the SRAM circuit.

Then, at time t4, the transfer control signal on the update line 8 becomes Low (hereinafter, referred to as "L level"), and thus the signal transfer switch 13 is turned OFF.

At time t5, the power supply voltage on the power supply line 7 is raised to a level of Vdrive (e.g., 25V), and thus the shutter electrode 20 is driven.

In an initial state, the shutter electrode 20 is in contact with either the control electrode 21 or 22. After time t1, as a result of the power supply voltage on the power supply line 7 becoming 0V, the shutter electrode 20 is moved to an intermediate position. Then, at time t5, the shutter electrode 20 starts moving toward either the control electrode 21 or 22. At this point, the shutter electrode 20 is supplied with a voltage of 0V. The control electrode on a high voltage side is supplied with a Vdrive voltage (e.g., 25V), whereas the control electrode on a low voltage side is supplied with a voltage of 0V.

Then, at time t6, at the timing when the shutter electrode 20 stops moving, the shutter control voltage on the shutter voltage line 11 becomes a level of Vrelease1 (e.g., 10V). As a result, the potential difference between the shutter electrode 20 and the control electrode on the high voltage side is decreased from 25V to 15V. At this point, the shutter electrode 20 is already at a stop. Therefore, there is no influence on the shutter characteristics even though the applied voltage is decreased.

Now, with reference to FIG. 5, an operation of the pixel circuit of the movable shutter-type image display device in this example in the state of "polarity inversion: shutter=high voltage" will be described.

Until time t1, the scanning line 10 is sequentially supplied with scanning voltages and an image signal is written in the storage capacitance 4.

Next, at time t1, the power supply voltage on the power supply line 7 becomes from a level of Vdrive (e.g., 25V) to 0V, and the shutter control voltage on the shutter voltage line 11 becomes from a level of Vrelease2 (e.g., 15V) to a level of Vdrive (e.g., 25V).

Next, at time t2, the transfer control signal on the update line 8 becomes H level, and thus the signal transfer switch 13 is turned ON. As a result, a signal is input to the SRAM circuit formed of the p-type MOS transistors 2 and 14 and the n-type MOS transistors 3 and 15.

At time t3, the power supply voltage of the power supply line 7 is raised to a level of Vlatch, and thus an image signal is latched by the SRAM circuit.

Then, at time t4, the transfer control signal on the update line 8 becomes L level, and thus the signal transfer switch 13 is turned OFF.

At time t5, the power supply voltage on the power supply line 7 is raised to a level of Vdrive (e.g., 25V), and thus the shutter electrode 20 is driven.

In an initial state, the shutter electrode 20 is in contact with either the control electrode 21 or 22. At time t5, the shutter electrode 20 starts moving toward either the control electrode 21 or 22. At this point, the shutter electrode 20 is supplied with a Vdrive voltage (e.g., 25V). The control electrode on the high voltage side is supplied with a Vdrive voltage (e.g., 25V), whereas the control electrode on the low voltage side is supplied with a voltage of 0V.

Then, at time t6, at the timing when the shutter electrode 20 stops moving, the shutter control voltage on the shutter voltage line 11 becomes a level of Vrelease2 (e.g., 15V). As a result, the potential difference between the shutter electrode 20 and the control electrode on the low voltage side is decreased from 25V to 15V. At this point, the shutter electrode 20 is already at a stop. Therefore, there is no influence on the shutter characteristics even though the applied voltage is decreased.

The operation in FIG. 5 is opposite to the operation in FIG. 4 in the high/low relationship regarding the shutter control voltage on the shutter voltage line 11. For this reason, the operation of the shutter 20 is different, but the basic operating principle is the same.

As described above, in this example, until the shutter electrode 20 contacts either the control electrode 21 or 22, the potential difference between the voltages applied to the electrodes is 25V as by the conventional art. After the electrodes contact each other, the potential difference between the voltages applied to the electrodes is decreased to 15V.

A leak current between the electrodes is in proportion to the voltage applied between the electrodes (Poole-Frankel injection current) or is an exponential function of the voltage applied between the electrodes (Fowler-Nordheim injection current). Therefore, the leak current heavily relies on the voltage.

The leak current is generated after the electrodes contact each other. By decreasing the potential difference between the voltages applied to the electrodes from 25V to 15V after the electrodes contact each other, the amount of trapped electrons (charges) caused by the leak current can be decreased significantly. As a result, the control fault of the mechanical shutter can be alleviated, and the life of the display device can be extended significantly.

The control of the shutter electrode (operation of moving the shutter electrode toward the control electrode 21 or toward the control electrode 22) uses the potential difference of 25V. Therefore, even though the applied voltage is decreased, there is no influence on the shutter characteristics.

In the above description, until the shutter electrode 20 contacts either the control electrode 21 or 22, the potential difference between the voltages applied to the electrodes is 25 V as by the conventional art. After the electrodes contact each other, the potential difference between the voltages applied to the electrodes is decreased to 15V. As long as the potential difference between the voltages applied to the electrodes is between 10V and 15V, substantially the same function and effect are provided.

EXAMPLE 2

A movable shutter-type image display device and a pixel circuit in this example have substantially the same structure as that in Example 1 described above, and will not be described again.

Figure 7:
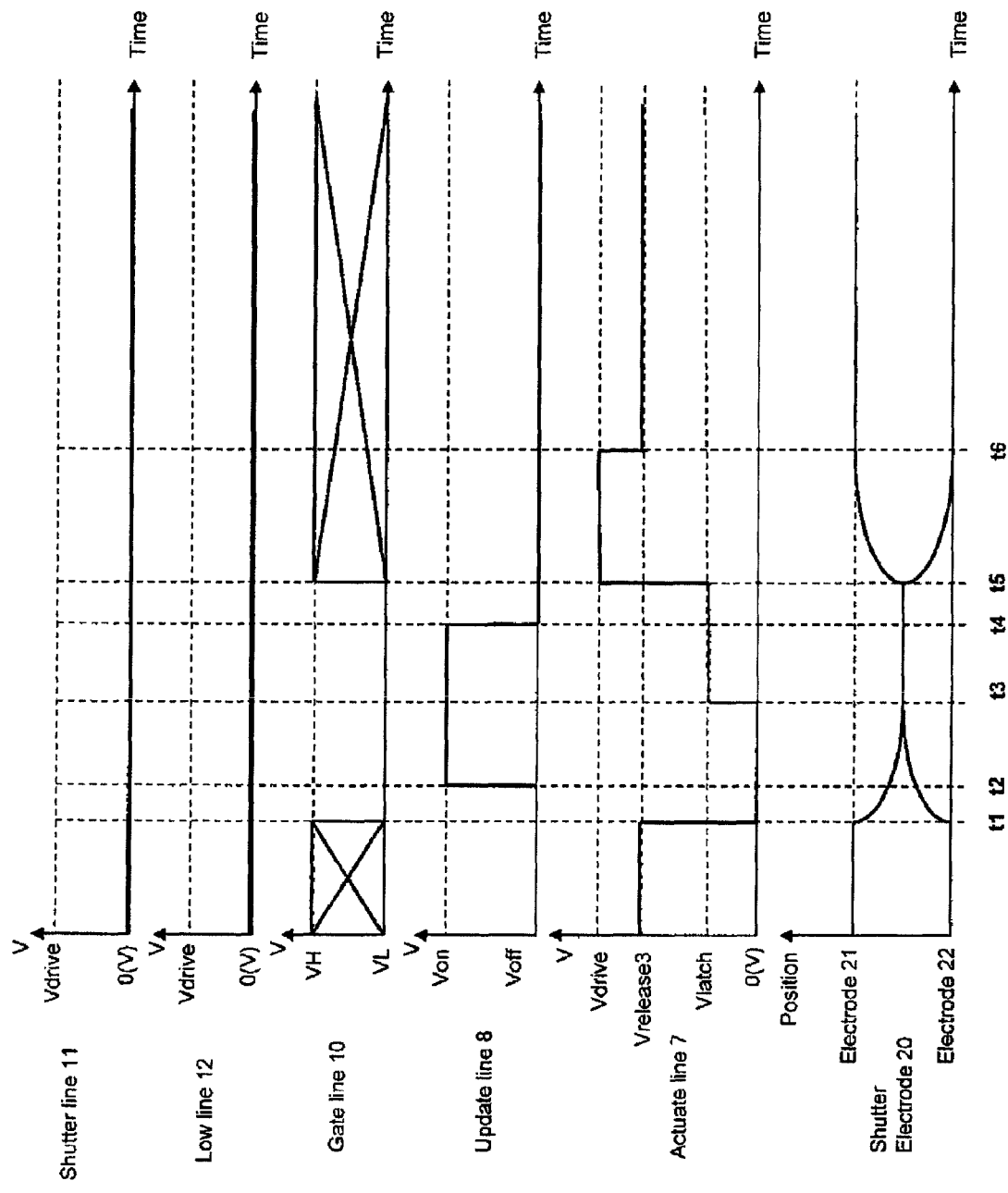
FIG. 7 is an operation timing diagram of a movable shutter-type image display device in Example 2 according to the present invention (polarity inversion: shutter=low voltage).
Figure 8:
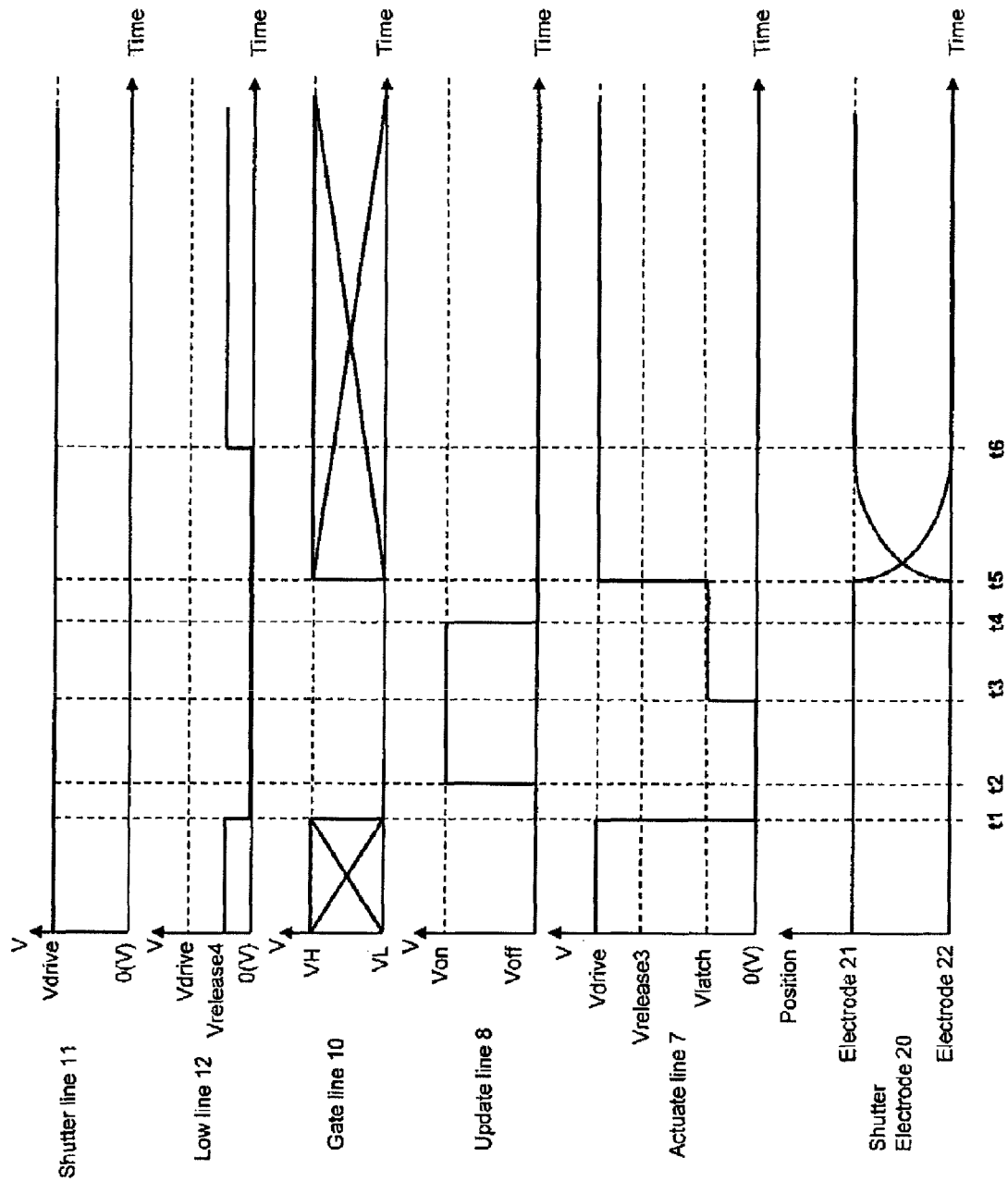
FIG. 8 is an operation timing diagram of the movable shutter-type image display device in Example 2 according to the present invention (polarity inversion: shutter=high voltage).

FIG. 7 and FIG. 8 are each an operation timing diagram of the movable shutter-type image display device in this example according to the present invention. FIG. 7 and FIG. 8 respectively correspond to FIG. 4 and FIG. 5 described above. In FIG. 7 and FIG. 8, regarding the shutter control voltage on the shutter voltage line (shutter line) 11, the power supply on the power supply line (low line) 12, the scanning voltage on the scanning line (gate line) 10, the transfer control signal on the update line 8, and the power supply voltage on the power supply line (actuate line) 7, the horizontal axis represents the time and the vertical axis represents the level of the voltage. Regarding the shutter electrode 20 at the bottom, FIG. 7 and FIG. 8 show the position of the shutter electrode 20 with respect to the control electrodes 21 and 22.

In this example, the power supply voltage on the power supply line 7, instead of the shutter control voltage on the shutter voltage line 11, is varied to decrease the voltage applied to the control voltages 21 and 22 from the level of the Vdrive voltage to the level of Vrelease3.

First, with reference to FIG. 7, an operation of the pixel circuit of the movable shutter-type image display device in this example in the state of "polarity inversion: shutter=low voltage" will be described. In FIG. 7, the shutter control voltage on the shutter voltage line 11 is 0V.

Until time t1, the scanning line 10 is sequentially supplied with scanning voltages and an image signal is written in the storage capacitance 4.

Next, at time t1, the power supply voltage on the power supply line 7 becomes from a level of Vrelease3 (e.g., 15V) to 0V.

Next, at time t2, the transfer control signal on the update line 8 becomes H level, and thus the signal transfer switch 13 is turned ON. As a result, a signal is input to the SRAM circuit formed of the p-type MOS transistors 2 and 14 and the n-type MOS transistors 3 and 15.

At time t3, the power supply voltage on the power supply line 7 is raised to a level of Vlatch, and thus an image signal is latched by the SRAM circuit.

Then, at time t4, the transfer control signal on the update line 8 becomes L level, and thus the signal transfer switch 13 is turned OFF.

At time t5, the power supply voltage on the power supply line 7 is raised to a level of Vdrive (e.g., 25V), and thus the shutter electrode 20 is driven.

In an initial state, the shutter electrode 20 is in contact with either the control electrode 21 or 22. After time t1, as a result of the power supply voltage on the power supply line 7 becoming 0V, the shutter electrode 20 is moved to an intermediate position. Then, at time t5, the shutter electrode 20 starts moving toward either the control electrode 21 or 22. At this point, the shutter electrode 20 is supplied with a voltage of 0V. The control electrode on the high voltage side is supplied with a Vdrive voltage (e.g., 25V), whereas the control electrode on the low voltage side is supplied with a voltage of 0V.

Then, at time t6, at the timing when the shutter electrode 20 stops moving, the power supply voltage on the power supply line 7 becomes a level of Vrelease3 (e.g., 15V). As a result, the potential difference between the shutter electrode 20 and the control electrode on the high voltage side is decreased from 25V to 15V. At this point, the shutter electrode 20 is already at a stop. Therefore, there is no influence on the shutter characteristics even though the applied voltage is decreased.

Now, with reference to FIG. 8, an operation of the pixel circuit of the movable shutter-type image display device in this example in the state of "polarity inversion: shutter=high voltage" will be described. In FIG. 8, the shutter control voltage on the shutter voltage line 11 is at a level of Vdrive.

Until time t1, the scanning line 10 is sequentially supplied with scanning voltages and an image signal is written in the storage capacitance 4.

Next, at time t1, the power supply voltage on the power supply line 12 becomes from a level of Vrelease4 (e.g., 10V) to 0V, and the power supply voltage on the power supply line 7 becomes from a level of Vdrive (e.g., 25V) to 0V.

Next, at time t2, the transfer control signal on the update line 8 becomes H level, and thus the signal transfer switch 13 is turned ON. As a result, a signal is input to the SRAM circuit formed of the p-type MOS transistors 2 and 14 and the n-type MOS transistors 3 and 15.

At time t3, the power supply voltage on the power supply line 7 is raised to a level of Vlatch, and thus an image signal is latched by the SRAM circuit.

Then, at time t4, the transfer control signal on the update line 8 becomes L level, and thus the signal transfer switch 13 is turned OFF.

At time t5, the power supply voltage on the power supply line 7 is raised to a level of Vdrive (e.g., 25V), and thus the shutter electrode 20 is driven.

In an initial state, the shutter electrode 20 is in contact with either the control electrode 21 or 22. At time t5, the shutter electrode 20 starts moving toward either the control electrode 21 or 22. At this point, the shutter electrode 20 is supplied with a Vdrive voltage (e.g., 25V). The control electrode on the high voltage side is supplied with a Vdrive voltage (e.g., 25V), whereas the control electrode on the low voltage side is supplied with a voltage of 0V.

Then, at time t6, at the timing when the shutter electrode 20 stops moving, the power supply voltage on the power supply line 12 becomes a level of Vrelease4 (e.g., 10V). As a result, the potential difference between the shutter electrode 20 and the control electrode on the low voltage side is decreased from 25V to 10V. At this point, the shutter electrode 20 is already at a stop. Therefore, there is no influence on the shutter characteristics even though the applied voltage is decreased.

In this example, the shutter control voltage on the shutter voltage line 11 can be of two values as in the conventional art.

This provides an advantage that the structure of the control line driving circuit 26 can be easily simplified.

EXAMPLE 3

Figure 16:
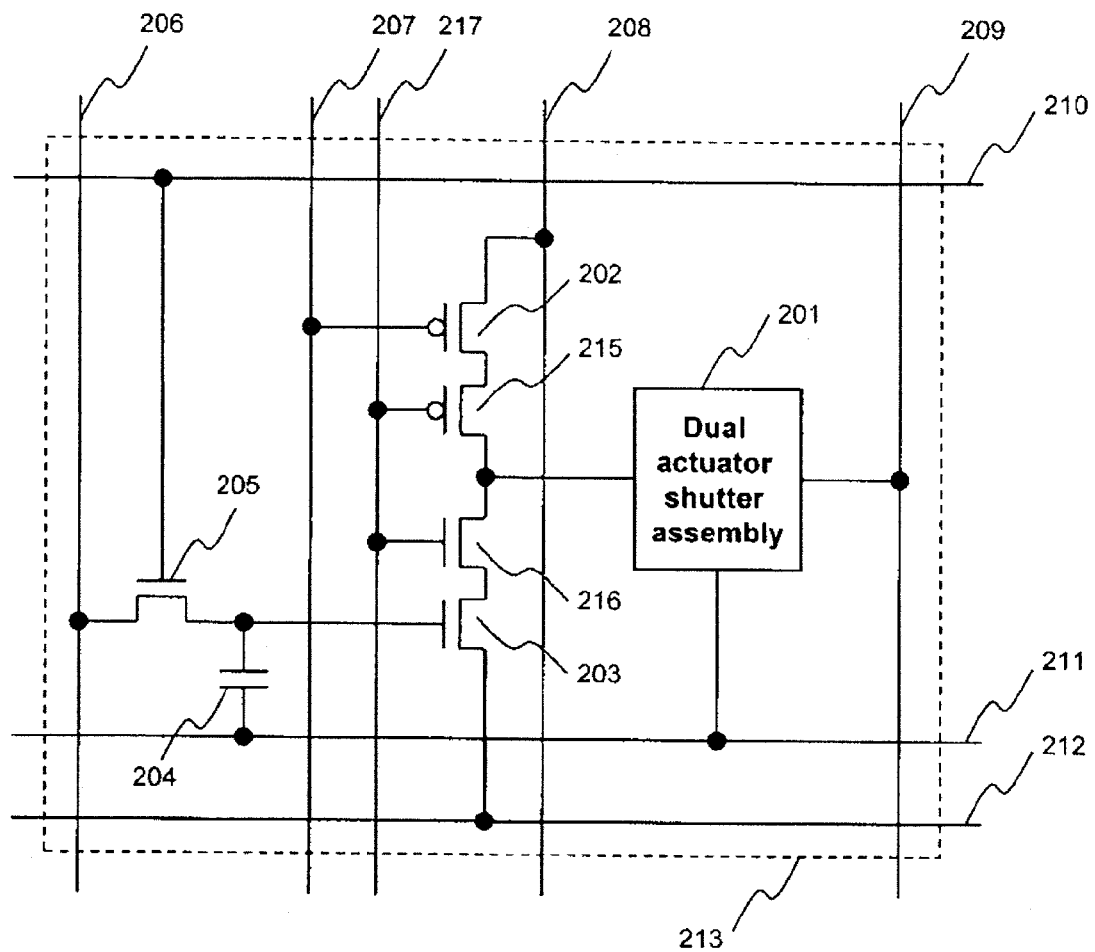
FIG. 16 is a circuit diagram showing a pixel circuit of a conventional movable shutter-type image display device.

In Example 3 according to the present invention, the present invention is applied to the conventional movable shutter-type image display device shown in FIG. 16.

Figure 9:
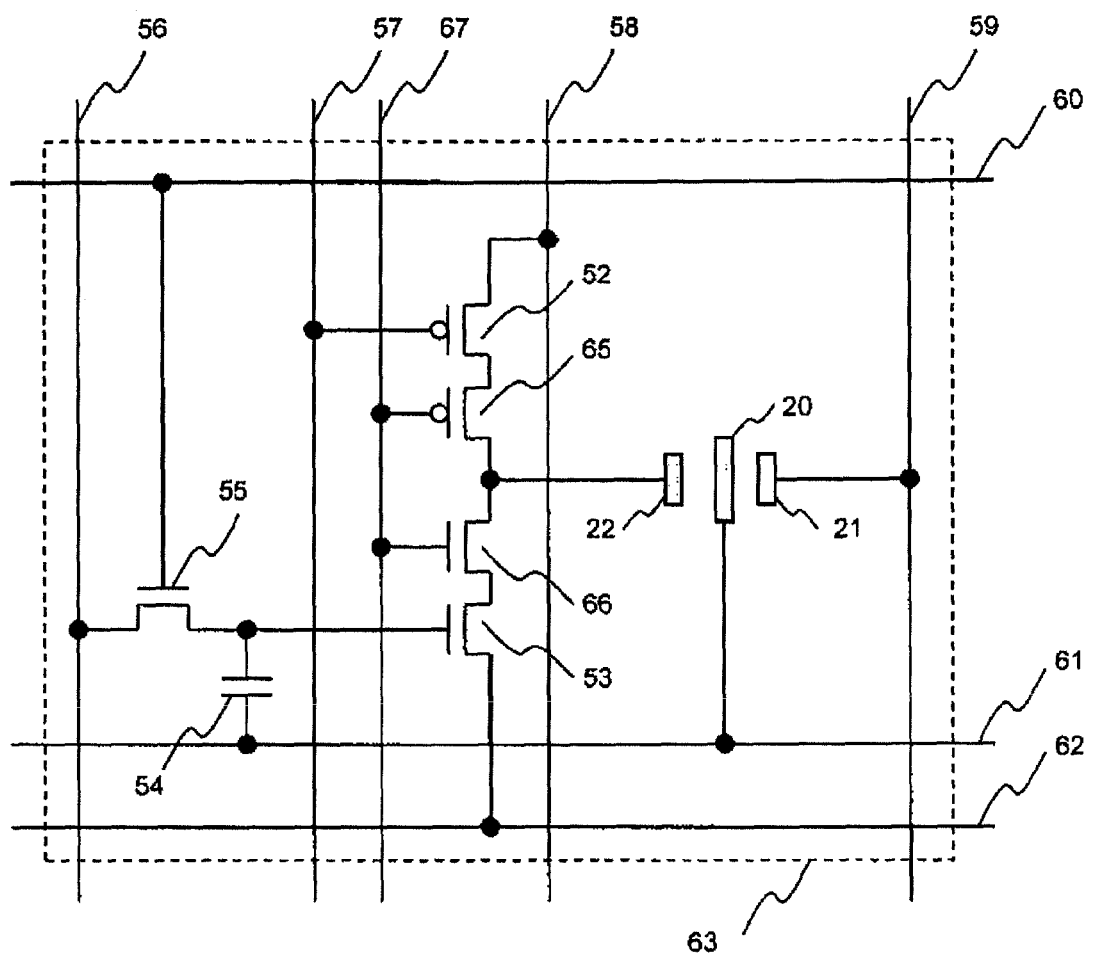
FIG. 9 is a circuit diagram showing a pixel circuit of a movable shutter-type image display device in Example 3 according to the present invention.

FIG. 9 is a circuit diagram showing a pixel circuit of a movable shutter-type image display device in this example, which is the same as the conventional pixel circuit of the movable shutter-type image display device shown in FIG. 16.

In FIG. 9, reference numerals 52 and 65 each represent a p-type MOS transistor, reference numerals 53 and 66 each represent an n-type MOS transistor, reference numeral 54 represents a signal storage capacitance (hereinafter, referred to as a "storage capacitance"), reference numeral 55 represents a signal transfer switch, reference numeral 56 represents a signal line, reference numeral 57 represents a pMOS gate voltage line (reset line according to the present invention), reference numeral 58 represents a positive voltage line, reference numeral 59 represents a control electrode voltage line (control line according to the present invention), reference numeral 60 represents a scanning line, reference numeral 61 represents a shutter voltage line, reference numeral 62 represents an nMOS source voltage line, reference numeral 63 represents a pixel circuit, and reference numeral 67 represents a cascode gate voltage line.

Figure 10:
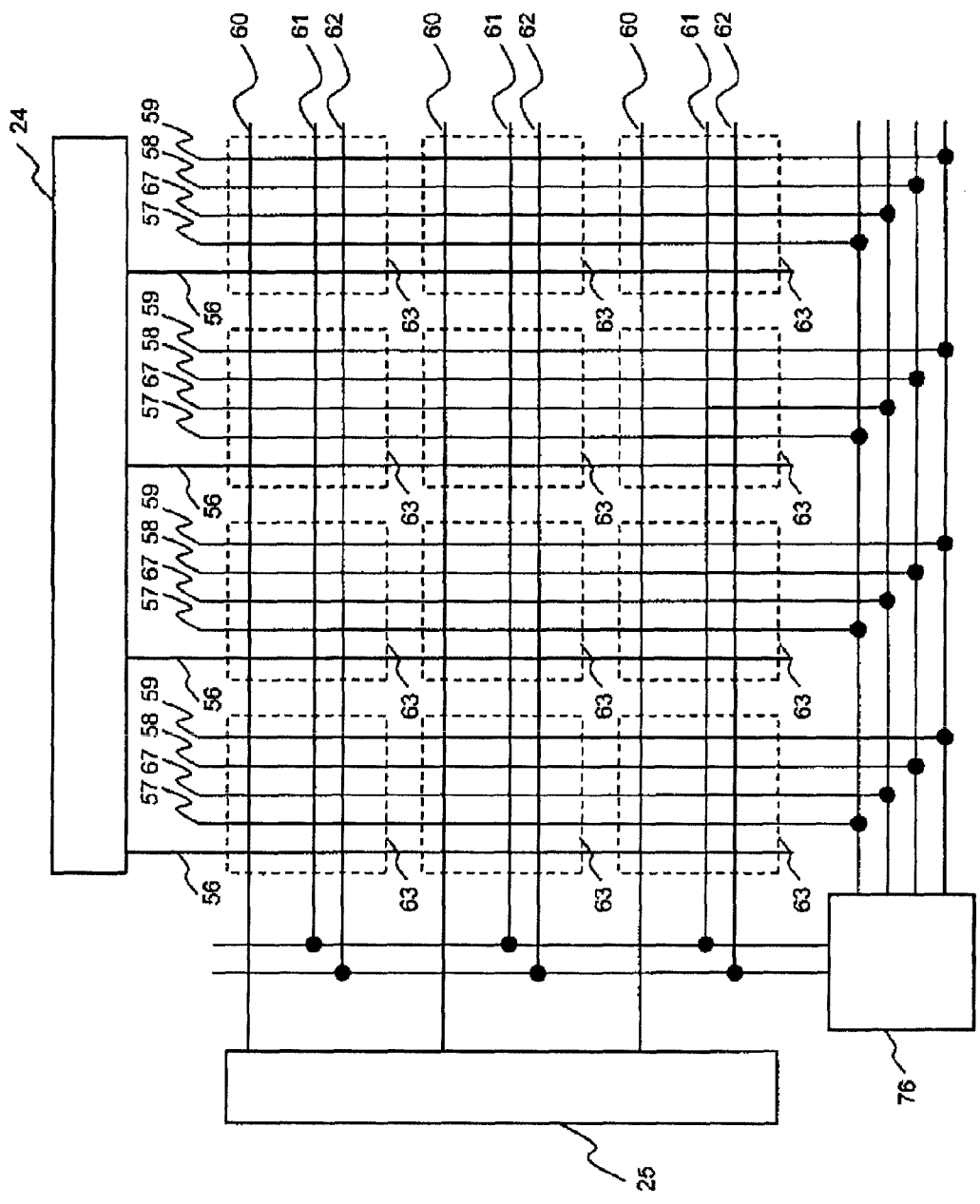
FIG. 10 is a block diagram showing a schematic structure of the movable shutter-type image display device in Example 3 according to the present invention.

FIG. 10 is a block diagram showing a schematic structure of the movable shutter-type image display device in this example.

Above the pixel circuits 63 arrayed in a matrix, an image signal voltage write circuit 24 is shown. To the left of the pixel circuits 63, a scanning circuit 25 is shown. Below the pixel circuits 63, a control electrode driving circuit 76 is shown.

In the movable shutter-type image display device shown in FIG. 10, a plurality of the pixel circuits 63 shown in FIG. 9 are arrayed two-dimensionally, and each pixel circuit 63 acts as a pixel. A scanning line 60 is provided for each row and is connected to the scanning circuit 25.

The signal line 56 is provided for each column and is connected to the image signal voltage write circuit 24. The pMOS gate voltage line 57, the positive voltage line 58, the control electrode voltage line 59, the shutter voltage line 61, the nMOS source voltage line 62, and the cascode gate voltage line 67 are provided commonly to the pixels, and are connected to a control electrode driving circuit 76.

Figure 11:
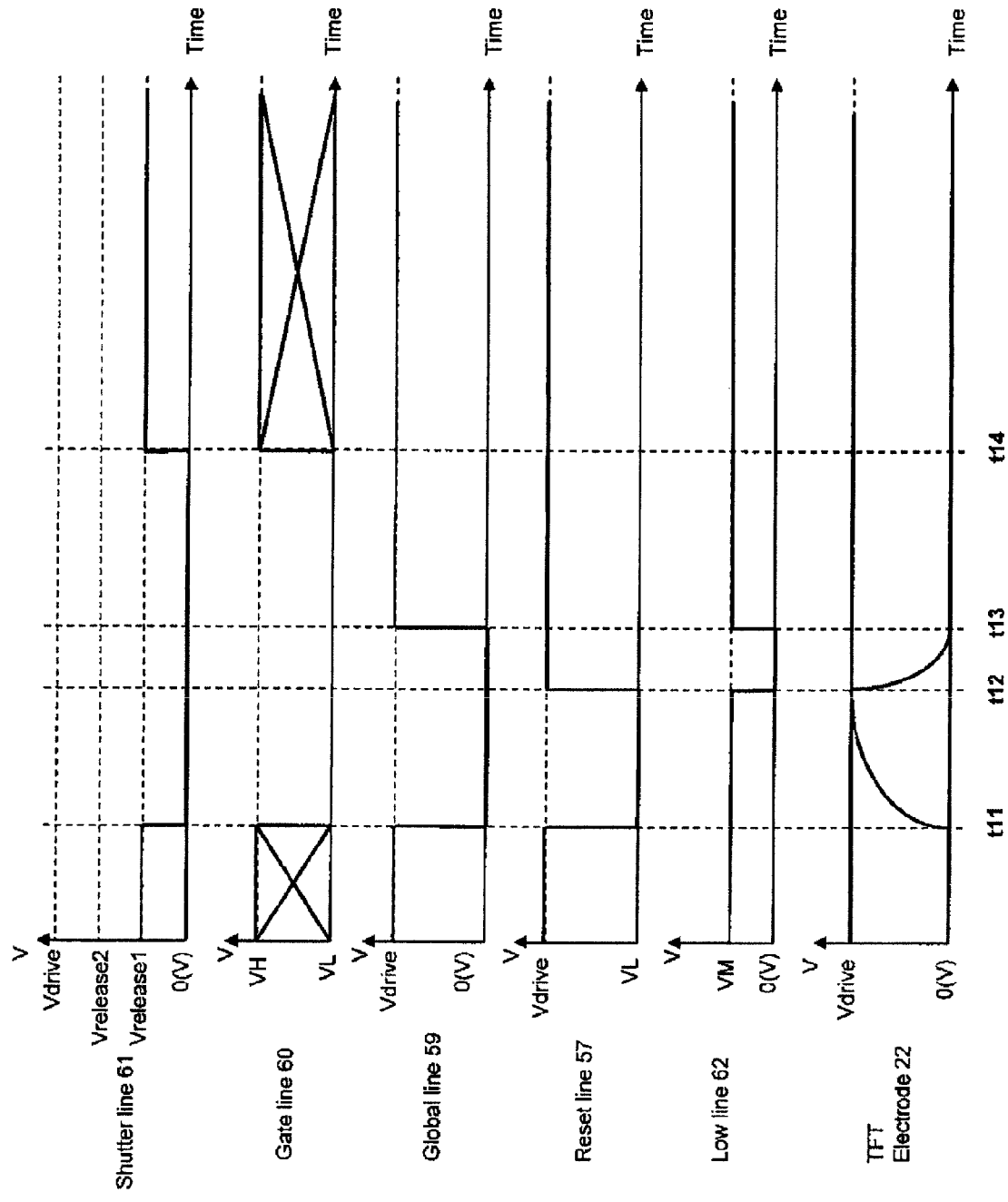
FIG. 11 is an operation timing diagram of the movable shutter-type image display device in Example 3 according to the present invention (polarity inversion: shutter=low voltage).
Figure 12:
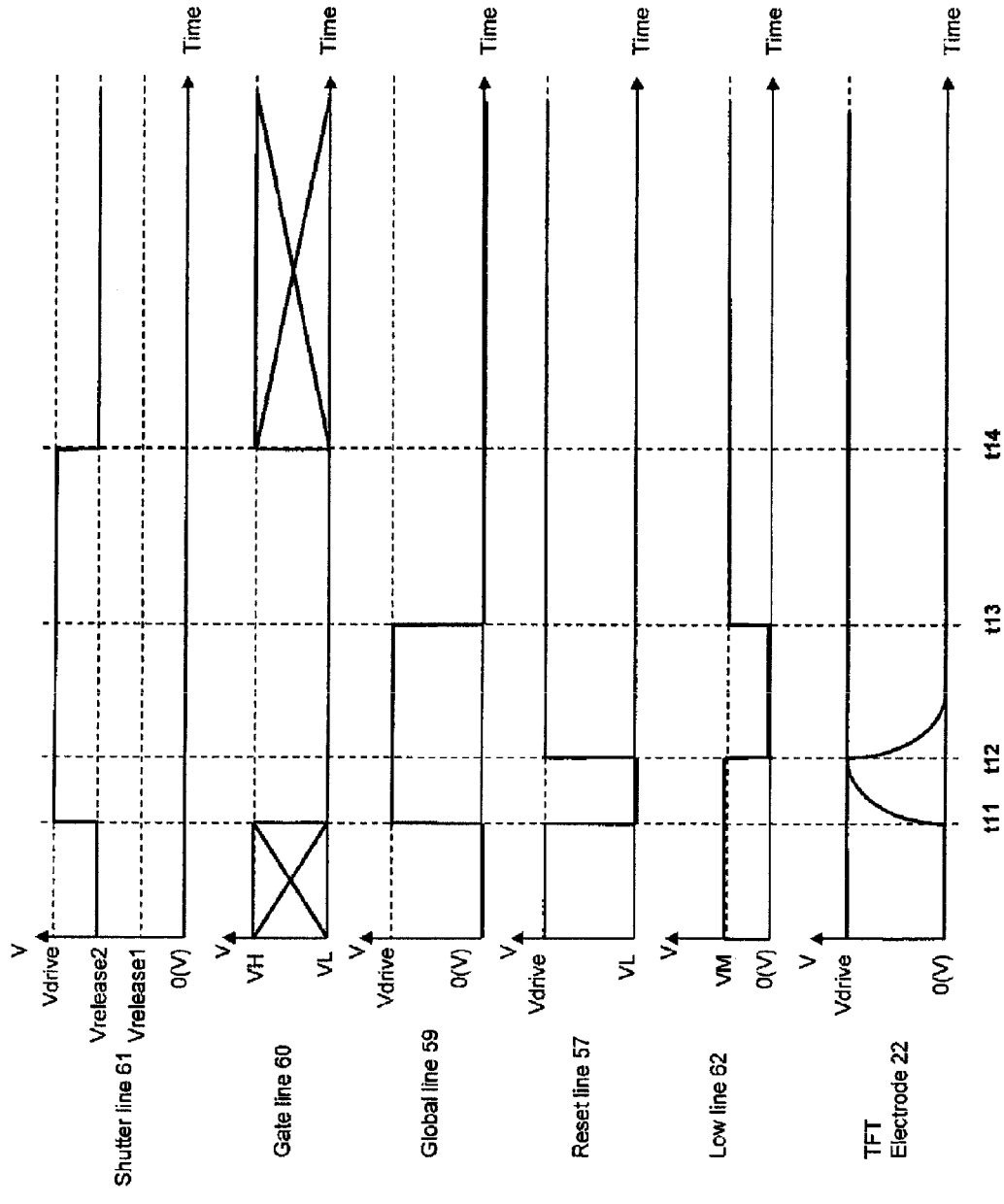
FIG. 12 is an operation timing diagram of the movable shutter-type image display device in Example 3 according to the present invention (polarity inversion: shutter=high voltage).

FIG. 11 and FIG. 12 are each a timing diagram of the movable shutter-type image display device in this example according to the present invention. In FIG. 11 and FIG. 12, regarding a shutter control voltage on the shutter voltage line (shutter line) 61, a scanning voltage on the scanning line (gate line) 60, a control voltage on the control electrode voltage line (global line) 59, a reset voltage on the pMOS gate voltage line (reset line) 57, a power supply voltage on the nMOS source voltage line (low line) 62, and a voltage to be applied to the control electrode 22, the horizontal axis represents the time and the vertical axis represents the level of the voltage.

First, with reference to FIG. 11, an operation of the pixel circuit of the movable shutter-type image display device in this example in the state of "polarity inversion: shutter=low voltage" will be described. In FIG. 11, the shutter control voltage on the shutter voltage line 61 is 0V.

Until time t11, the scanning line 60 is sequentially supplied with scanning voltages and an image signal is written in the storage capacitance 54.

Next, at time t11, the shutter control voltage on the shutter voltage line 61 becomes from a level of Vrelease1 (e.g., 10V) to 0V. The control voltage on the control electrode voltage line 59 becomes from a level of Vdrive (e.g., 25V) to 0V. The reset voltage on the pMOS gate voltage line (reset line) 57 becomes from a level of Vdrive to 0V.

As a result, the potential difference between the control electrode 21 and the shutter electrode 20 becomes 0V, and a Vdrive voltage is applied to the control electrode 22 via the p-type MOS transistor 52. Therefore, the shutter electrode 20 moves toward the control electrode 22. The positive voltage line 58 is always supplied with a Vdrive voltage.

Next, at time t12, the reset voltage on the pMOS gate voltage line 57 becomes from 0V to a level of Vdrive, and the voltage on the nMOS source voltage line 62 becomes from a level of VM (e.g., 5V) to 0V.

When the voltage on the nMOS source voltage line 62 becomes 0V, in the case where the storage capacitance 54 stores an image signal of 5V, the n-type MOS transistor 53 is turned ON, and a voltage of 0V is applied to the control electrode 22. In the case where the storage capacitance 54 stores an image signal of 0V, the n-type MOS transistor 53 is not turned ON. Thus, the control electrode 22 is kept supplied with the Vdrive voltage.

When the n-type MOS transistor 53 is turned ON and a voltage of 0V is applied to the control electrode 22, the shutter electrode 20, which has been moved toward the control electrode 22, moves to an intermediate position.

At time t13, the control voltage on the control electrode voltage line 59 becomes from 0V to a level of Vdrive, and the voltage on the nMOS source voltage line 62 becomes from 0 V to a level of VM.

When the control voltage on the control electrode voltage line 59 becomes the level of Vdrive at time t13, the shutter electrode 20, which has been moved to the intermediate position during the period from time t12 to time t13, moves toward the control electrode 21.

Then, at time t14, at the timing when the shutter electrode 20 stops moving, the shutter control voltage on the shutter voltage line 61 becomes from 0V to a level of Vrelease1. As a result, the potential difference between the control electrode on the high voltage side and the shutter electrode 20 is decreased from 25V to 15V. At this point, the shutter electrode 20 is already at a stop. Therefore, there is no influence on the shutter characteristics even though the applied voltage is decreased.

Now, with reference to FIG. 12, an operation of the pixel circuit of the movable shutter-type image display device in this example in the state of "polarity inversion: shutter=high voltage" will be described. In FIG. 12, the shutter control voltage on the shutter voltage line 61 is at a level of Vdrive.

Until time t11, the scanning line (gate line) 60 is sequentially supplied with scanning voltages and an image signal is written in the storage capacitance 54.

Next, at time t11, the shutter control voltage on the shutter voltage line 61 becomes from a level of Vrelease2 (e.g., 15V) to a level of Vdrive (e.g., 25V). The control voltage on the control electrode voltage line (global line) 59 becomes from 0V to a level of Vdrive (e.g., 25V). The reset voltage on the pMOS gate voltage line (reset line) 57 becomes from a level of Vdrive to 0V.

As a result, the potential difference between the control electrode 21 and the shutter electrode 20 becomes 0 V, and a Vdrive voltage is applied to the control electrode 22 via the p-type MOS transistor 52. Therefore, the shutter electrode 20 moves to an intermediate position.

At time t12, the reset voltage on the pMOS gate voltage line 57 becomes from 0V to a level of Vdrive, and the voltage on the nMOS source voltage line (low line) 62 becomes from a level of VM (e.g., 5V) to 0V.

When the voltage on the nMOS source voltage line 62 becomes 0V, in the case where the storage capacitance 54 stores an image signal of 5V, the n-type MOS transistor 53 is turned ON, and a voltage of 0V is applied to the control electrode 22. In the case where the storage capacitance 54 stores an image signal of 0V, the n-type MOS transistor 53 is not turned ON. Thus, the control electrode 22 is kept supplied with the Vdrive voltage.

When the n-type MOS transistor 53 is turned ON and a voltage of 0 V is applied to the control electrode 22, the shutter electrode 20 moves toward the control electrode 22.

At time t13, the control voltage on the control electrode voltage line 59 becomes from a level of Vdrive to 0V, and the voltage on the nMOS source voltage line 62 becomes from 0V to a level of VM.

When the control voltage on the control electrode voltage line 59 becomes 0V at time t13, the shutter electrode 20, which has been moved to the intermediate position during the period from time t12 to time t13, moves toward the control electrode 21.

Then, at time t14, at the timing when the shutter electrode 20 stops moving, the shutter control voltage on the shutter voltage line 61 becomes from a level of Vdrive to a level of Vrelease2. As a result, the potential difference between the shutter electrode 20 and the control electrode on the low voltage side is decreased from 25V to 15V. At this point, the shutter electrode 20 is already at a stop. Therefore, there is no influence on the shutter characteristics even though the applied voltage is decreased.

A comparison between the timing diagram of FIG. 12 and timing diagram of FIG. 11 shows that the high/low relationship of the shutter control voltage on the shutter voltage line 61 and the control voltage on the control electrode voltage line 59 is opposite to each other, and the voltage applied to the control electrode 22 is different. However, the basic operating principle is the same.

The timing at which the shutter electrode 20 operates is different between FIG. 11 and FIG. 12, and the timing for obtaining a sufficient operation time is optimized. Therefore, in FIG. 11, the period between time 11 and time 12 is long; and in FIG. 12, the period between time 12 and time 13 is long.

This example provides an advantage that the number of MOS transistors required in the pixel circuit 63 can be decreased.

EXAMPLE 4

A movable shutter-type image display device and a pixel circuit in this example have substantially the same structure as that in Example 3 described above, and will not be described again.

Figure 13:
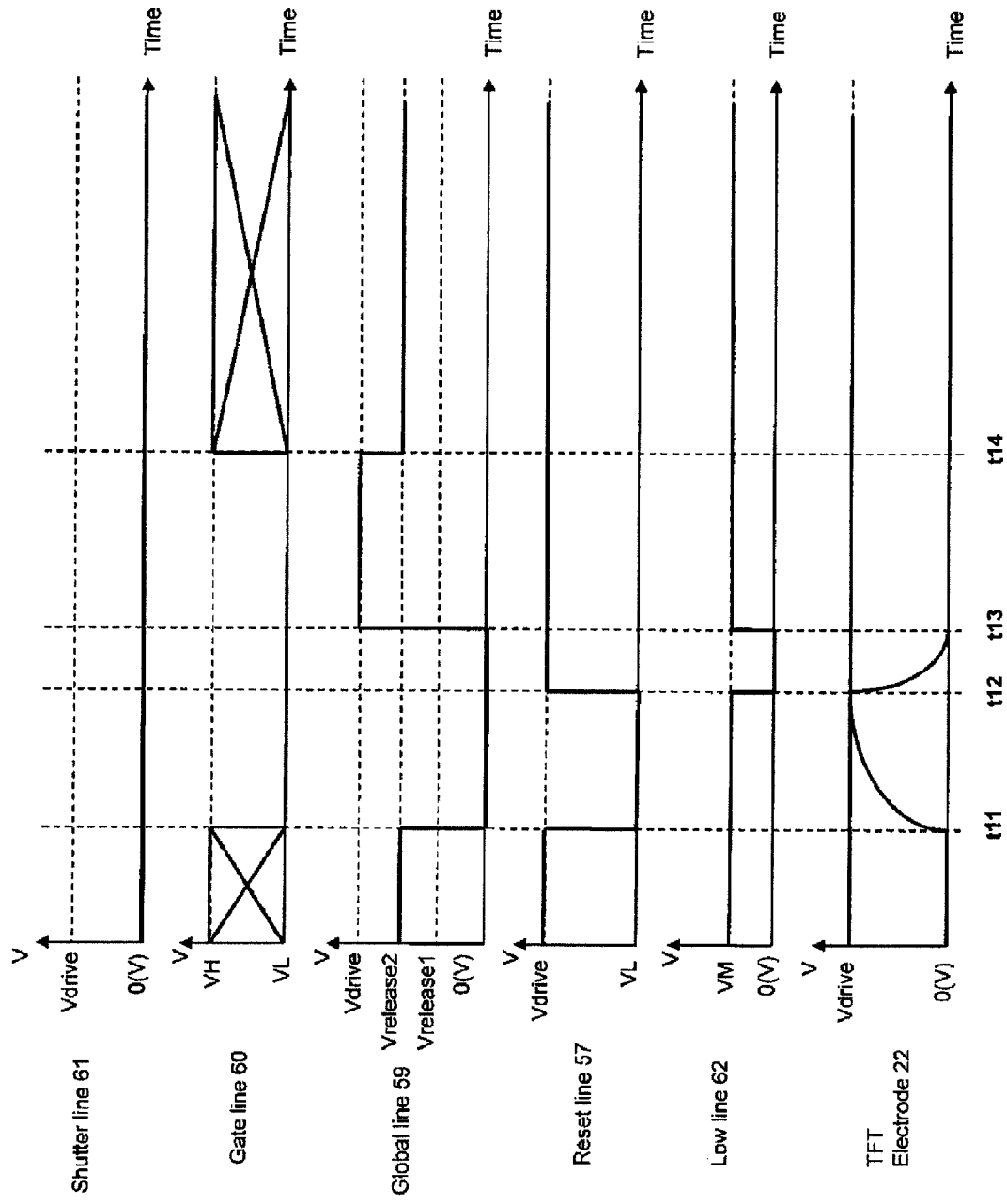
FIG. 13 is an operation timing diagram of a movable shutter-type image display device in Example 4 according to the present invention (polarity inversion: shutter=low voltage).
Figure 14:
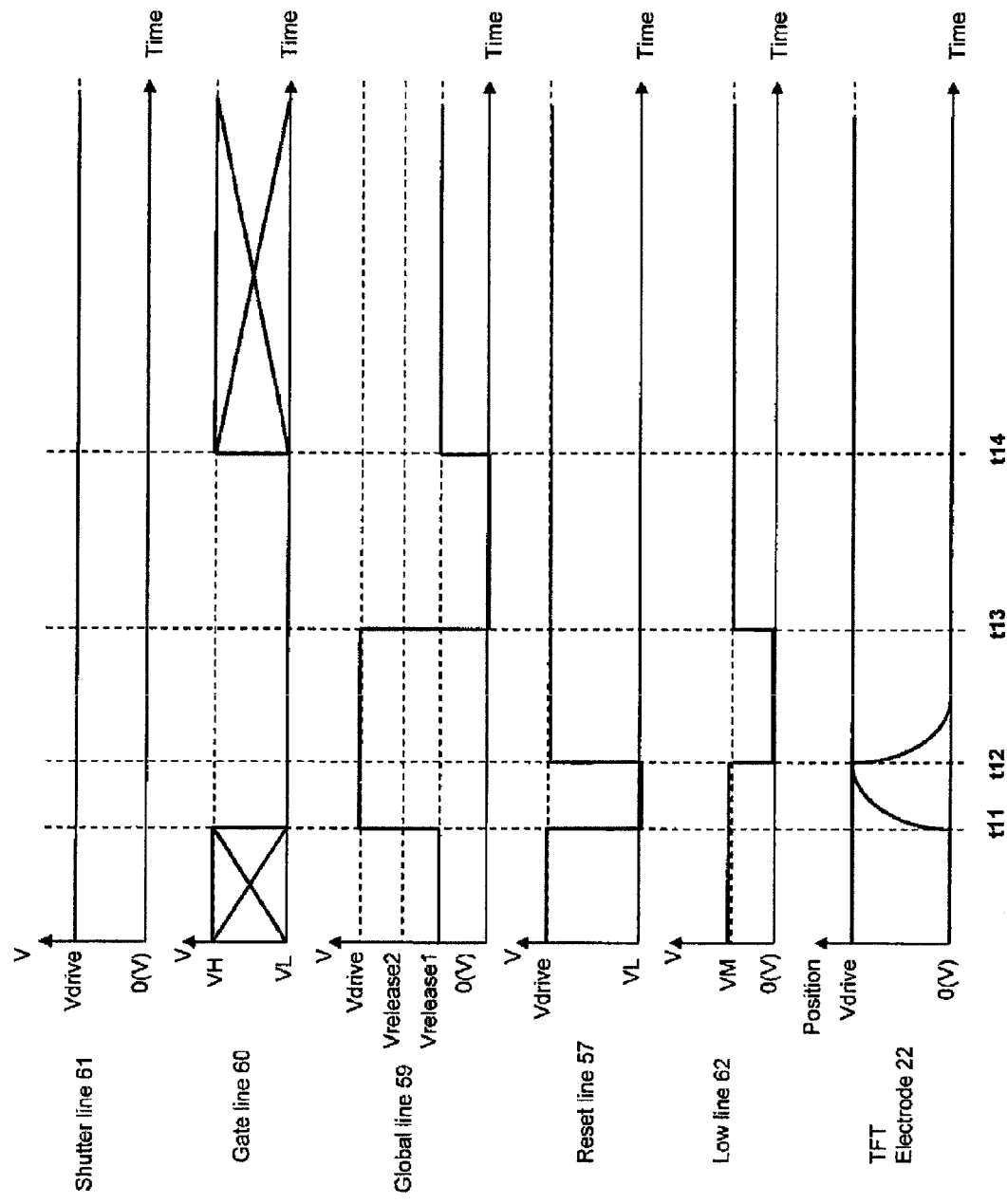
FIG. 14 is an operation timing diagram of the movable shutter-type image display device in Example 4 according to the present invention (polarity inversion: shutter=high voltage).

FIG. 13 and FIG. 14 are each a timing diagram of the movable shutter-type image display device in this example. FIG. 13 and FIG. 14 respectively correspond to FIG. 11 and FIG. 12 described above. In FIG. 13 and FIG. 14, regarding the shutter control voltage on the shutter voltage line (shutter line) 61, the scanning voltage on the scanning line (gate line) 60, the control signal on the control electrode voltage line (global line) 59, the reset voltage on the pMOS gate voltage line (reset line) 57, the power supply voltage on the nMOS source voltage line (low line) 62, and the voltage to be applied to the control electrode 22, the horizontal axis represents the time and the vertical axis represents the level of the voltage.

In FIG. 13 and FIG. 14, the control voltage on the control electrode voltage line 59, instead of the shutter control voltage on the shutter voltage line 61, is decreased in the middle from a level of Vdrive to a level of Vrelease1 or a level of Vrelease2.

First, with reference to FIG. 13, an operation of the pixel circuit of the movable shutter-type image display device in this example in the state of "polarity inversion: shutter=low voltage" will be described. In FIG. 13, the shutter control voltage on the shutter voltage line 61 is 0V.

Until time t11, the scanning line 60 is sequentially supplied with scanning voltages and an image signal is written in the storage capacitance 54.

Next, at time t11, the control voltage on the control electrode voltage line (global line) 59 becomes from a level of Vrelease2 (e.g., 15V) to 0V, and the reset voltage on the pMOS gate voltage line (reset line) 57 becomes from a level of Vdrive to 0V.

As a result, the potential difference between the control electrode 21 and the shutter electrode 20 becomes 0V, and a Vdrive voltage is applied to the control electrode 22 via the p-type MOS transistor 52. Therefore, the shutter electrode 20 moves toward the control electrode 22.

At time t12, the reset voltage on the pMOS gate voltage line 57 becomes from 0V to a level of Vdrive, and the voltage on the nMOS source voltage line 62 becomes from a level of VM (e.g., 5V) to 0V.

When the voltage on the nMOS source voltage line 62 becomes 0V, in the case where the storage capacitance 54 stores an image signal of 5V, the n-type MOS transistor 53 is turned ON, and a voltage of 0V is applied to the control electrode 22. In the case where the storage capacitance 54 stores an image signal of 0V, the n-type MOS transistor 53 is not turned ON. Thus, the control electrode 22 is kept supplied with the Vdrive voltage.

When the n-type MOS transistor 53 is turned ON and a voltage of 0V is applied to the control electrode 22, the shutter electrode 20, which has been moved toward the control electrode 22, moves to an intermediate position.

At time t13, the control voltage on the control electrode voltage line 59 becomes from 0V to a level of Vdrive, and the voltage on the nMOS source voltage line 62 becomes from 0 V to a level of VM.

When the control voltage on the control electrode voltage line 59 becomes the level of Vdrive at time t13, the shutter electrode 20, which has been moved to the intermediate position during the period from time t12 to time t13, moves toward the control electrode 21.

Then, at time t14, at the timing when the shutter electrode 20 stops moving, the control voltage on the control electrode voltage line 59 becomes from a level of Vdrive to a level of Vrelease2. As a result, the potential difference between the shutter electrode 20 and the control electrode 21 is decreased from 25V to 15V. At this point, the shutter electrode 20 is already at a stop. Therefore, there is no influence on the shutter characteristics even though the applied voltage is decreased.

Now, with reference to FIG. 14, an operation of the pixel circuit of the movable shutter-type image display device in this example in the state of "polarity inversion: shutter=high voltage" will be described. In FIG. 14, the shutter control voltage on the shutter voltage line (shutter line) 61 is at a level of Vdrive.

Until time t11, the scanning line (gate line) 60 is sequentially supplied with scanning voltages and an image signal is written in the storage capacitance 54.

Next, at time t11, the control voltage on the control electrode voltage line (global line) 59 becomes from a level of Vrelease1 (e.g., 10V) to a level of Vdrive (e.g., 25V), and the reset voltage on the pMOS gate voltage line (reset line) 57 becomes from a level of Vdrive to 0V.

As a result, the potential difference between the control electrode 21 and the shutter electrode 20 becomes 0V, and a Vdrive voltage is applied to the control electrode 22 via the p-type MOS transistor 52. Therefore, the shutter electrode 20 moves to an intermediate position.

At time t12, the reset voltage on the pMOS gate voltage line 57 becomes from 0V to a level of Vdrive, and the voltage on the nMOS source voltage line (low line) 62 becomes from a level of VM (e.g., 5V) to 0V.

When the voltage on the nMOS source voltage line 62 becomes 0V, in the case where the storage capacitance 54 stores an image signal of 5 V, the n-type MOS transistor 53 is turned ON, and a voltage of 0V is applied to the control electrode 22. In the case where the storage capacitance 54 stores an image signal of 0V, the n-type MOS transistor 53 is not turned ON. Thus, the control electrode 22 is kept supplied with the Vdrive voltage.

When the n-type MOS transistor 53 is turned ON and a voltage of 0V is applied to the control electrode 22, the shutter electrode 20 moves toward the control electrode 22.

At time t13, the control voltage on the control electrode voltage line 59 becomes from a level of Vdrive to 0 V, and the voltage on the nMOS source voltage line 62 becomes from 0 V to a level of VM.

When the control voltage on the control electrode voltage line 59 becomes 0 V at time t13, the shutter electrode 20, which has been moved to the intermediate position during the period from time t12 to time t13, moves toward the control electrode 21.

Then, at time t14, at the timing when the shutter electrode 20 stops moving, the control voltage on the control electrode voltage line 59 becomes from a level of 0V to a level of Vrelease1. As a result, the potential difference between the shutter electrode 20 and the control electrode 21 is decreased from 25V to 15V. At this point, the shutter electrode 20 is already at a stop. Therefore, there is no influence on the shutter characteristics even though the applied voltage is decreased.

In this example, the potential difference from the shutter electrode 20 is only the control electrode 21. Instead of the shutter voltage line 61 which is connected to the storage capacitance and has a large load capacitance, the control electrode voltage line 59 drives the shutter electrode 20 with four values of voltage. This provides an advantage that the driving capacitance is small and thus the structure of the control electrode driving circuit 26 can be easily simplified.

EXAMPLE 5

Figure 15:
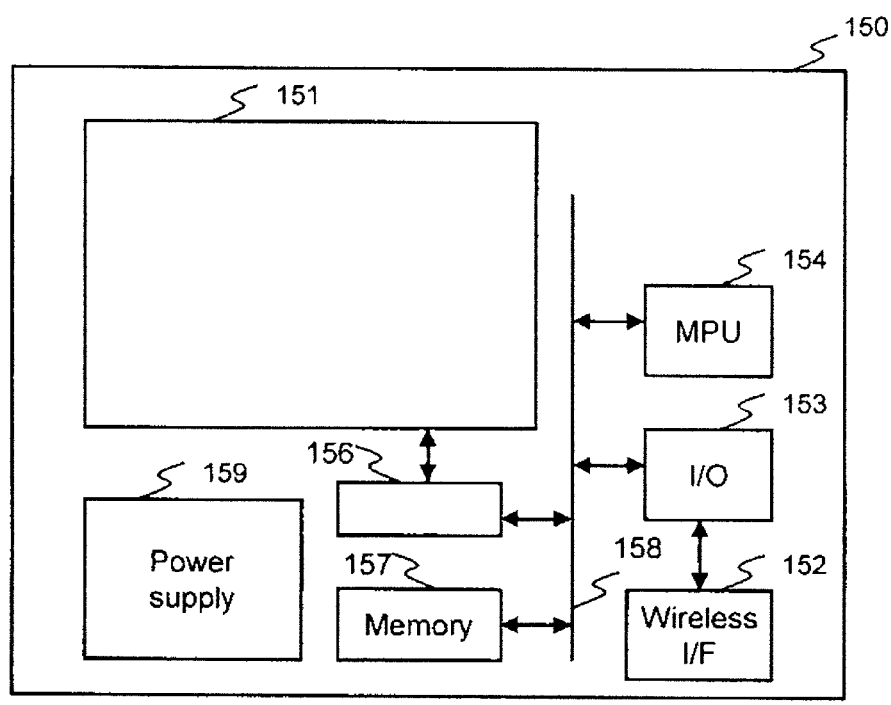
FIG. 15 is a block diagram showing a schematic structure of an internet image display device using a movable shutter-type image display device in Example 5 according to the present invention.

FIG. 15 is a block diagram showing a schematic structure of an internet image display device 150 which uses a movable shutter-type image display device in Example 5 according to the present invention.

Hereinafter, with reference to FIG. 15, the internet image display device 150 in Example 5 will be described.

To a wireless interface (I/F) circuit 152, compressed image data or the like is input as wireless data from outside. An output of the wireless I/F circuit 152 is connected to a data bus 158 via an I/O (input/output) circuit 153.

The data bus 158 is also connected to a microprocessor (MPU) 154, a display panel controller 156, a frame memory 157 and the like.

An output of the display panel controller 156 is connected to a display device 151 which uses a mechanical shutter. The Internet image display device 150 also includes a power supply 159.

The display device 151 using the mechanical shutter has substantially the same structure as, and performs substantially the same operation as, those in Example 1 described above, and thus an internal structure and operation will thereof not be described.

Hereinafter, an operation of the internet image display device in Example 5 will be described.

First, the wireless I/O circuit 152 receives compressed image data from outside in compliance with an instruction, and transfers the image data to the microprocessor 154 and the frame memory 157 via the I/O circuit 153.

Upon receiving an instruction from the user, the microprocessor 154 drives the entirety of the internet image display device 150 when necessary to decode the compressed image data, process signals and display information. The image data processed here can be temporarily stored on the frame memory 157.

When the microprocessor 154 issues an instruction to display, the image data is input from the frame memory 157 to the display device 151 via the display panel controller 154 in compliance with the instruction. The display device 151 displays the input image data in real time.

At the same time, the display panel controller 156 also controls output of prescribed timing pulses required to display the image.

As described in Example 1, the display device 151 uses these signals to display the input image data in real time. The power supply 159 includes a secondary cell, which supplies power for driving the entirety of the Internet image display device 150.

According to this example, the internet image display device 150 capable of providing high quality display with small power consumption can be provided at low cost.

In this example, the display device 151 as described in Example 1 is used as an image display device. Obviously, any of various display devices described in other examples is usable.

Needless to say, in such a case, the timing pulses output by the display panel controller 156 need to be changed slightly.

In the above description, n-type polycrystalline silicon thin film transistors are used. Alternatively, amorphous silicon thin film transistors, which are obtained with no need of crystallization and thus can be produced by a low cost process, may be usable.

As described above, in this example, until the shutter electrode 20 contacts either the control electrode 21 or the control electrode 22, the potential difference between the voltages applied to the electrodes is 25V as by the conventional art. After the electrodes contact each other, the potential difference between the voltages applied to the electrodes is decreased to 15V.

Owing to this, the amount of trapped electrons (charges) caused by a leak current can be decreased significantly. As a result, the control fault of the mechanical shutter can be alleviated, and the life of the display device can be extended significantly.

The invention made by the present inventor has been described by way of examples. The present invention is not limited to the above-provided examples and may be modified in any of various manners without departing from the scope of the gist of the invention.

Effects provided by representative subject matter of the invention disclosed in this application are as follows.

According to a movable shutter-type image display device of the present invention, the amount of trapped electrons (charges) caused by a leak current can be decreased significantly. As a result, the control fault of the mechanical shutter can be alleviated, and the life of the display device can be extended significantly.

The invention claimed is:

1. A display device, comprising a plurality of pixel areas each including a mechanical shutter, wherein an amount of light transmitted by each pixel area is based on the position of the mechanical shutter of the pixel area over an opening within the pixel area through which light can pass, the display device electrically controlling the position of the mechanical shutter relative to the opening to provide image display, wherein:

each of the pixel areas includes a pixel circuit for electrically controlling the position of the mechanical shutter; and the pixel circuit includes:
a first control electrode and a second control electrode provided as a pair with respect to the mechanical shutter;
a first means for applying, based on image data for an image frame, a prescribed control voltage to the first control electrode and the second control electrode to position the mechanical shutter in contact with the first control electrode such that the mechanical shutter blocks the opening in the pixel area or to position the mechanical shutter in contact with the second control electrode such that the mechanical shutter does not block the opening in the pixel area; and
a second means for, at about the beginning of a time period extending from a time when the mechanical shutter comes to a stop to a time when image data for a subsequent image frame is loaded in the pixel circuit, decreasing a potential difference between the mechanical shutter and the first control electrode or the second control electrode which is in contact with the mechanical shutter while maintaining the mechanical shutter in contact with the first control electrode or the second control electrode.

2. The display device according to claim 1, wherein the second means decreases the potential difference between the mechanical shutter and the first control electrode which is in contact with the mechanical shutter or the potential difference between the mechanical shutter and the second control electrode which is in contact with the mechanical shutter, by controlling a shutter control voltage to be applied to the mechanical shutter.

3. The display device according to claim 1, wherein the second means decreases the potential difference between the mechanical shutter and the first control electrode which is in contact with the mechanical shutter or the potential difference between the mechanical shutter and the second control electrode which is in contact with the mechanical shutter.

4. The display device according to claim 1, wherein the pixel circuit switches a state in which a control voltage lower than a shutter control voltage to be applied to the mechanical shutter is applied to the first control electrode and the second control electrode, and a state in which a control voltage higher than the shutter control voltage to be applied to the mechanical shutter is applied to the first control electrode and the second control electrode, at a prescribed timing.

5. A display device, comprising:
a plurality of pixel areas each including a mechanical shutter, wherein an amount of light transmitted by each pixel area is based on the position of the mechanical shutter of the pixel area over an opening within the pixel area through which light can pass;
a signal line for inputting an image signal to each of the pixel areas;
a scanning line for inputting a scanning voltage to each of the pixel areas;
a first power supply line to be supplied with a first power supply voltage;
a second power supply line to be supplied with a second power supply voltage; and
a shutter voltage line connected to the mechanical shutter and to be supplied with a shutter control voltage;
wherein:
the display device electrically controls the position of the mechanical shutter to provide image display;
each of the pixel areas includes a pixel circuit for electrically controlling the position of the mechanical shutter;
the pixel circuit includes:
a first control electrode and a second control electrode provided as a pair with respect to the mechanical shutter;
an input transistor which includes a current terminal having one end connected to the signal line, the input transistor having a gate connected to the scanning line;
a storage capacitor having one end connected to the other end of the current terminal of the input transistor and having the other end connected to the first power supply line, the storage capacitor storing a voltage received by the input transistor;
a first transistor of a first conductivity type which includes a current terminal having one end connected to the second power supply line and the other end connected to the second control electrode, the first transistor having a gate to which the voltage stored by the storage capacitor is input;
a second transistor of the first conductivity type which includes a current terminal having one end connected to the second power supply line and the other end connected to the first control electrode, the second transistor having a gate connected to the second control electrode;
a third transistor of a second conductivity type which includes a current terminal having one end connected to the first power supply line and the other end connected to the second control electrode, the third transistor having a gate to which the voltage stored by the storage capacitor is input; and
a fourth transistor of the second conductivity type which includes a current terminal having one end connected to the first power supply line and the other end connected to the first control electrode, the fourth transistor having a gate connected to the second control electrode;
wherein a voltage level of the shutter control voltage is changed at a prescribed timing, based on image data for an image frame, to position the mechanical shutter in contact with the first control electrode such that the mechanical shutter blocks the opening in the pixel area or to position the mechanical shutter in contact with the second control electrode such that the mechanical shutter does not block the opening in the pixel area, and wherein at about the beginning of a time period extending from a time when the mechanical shutter comes to a stop to a time when image data for a subsequent image frame is loaded in the pixel circuit, a potential difference between the mechanical shutter and the first control electrode or the second control electrode which is in contact with the mechanical shutter is decreased while maintaining the mechanical shutter in contact with the first control electrode or the second control electrode.

6. The display device according to claim 5, further comprising a transfer transistor which includes a current terminal having one end connected to the first control electrode and the other end connected to the one end of the storage capacitor, the transfer transistor having a gate to which a transfer control signal is input.

7. The display device according to claim 5, wherein:
the first and second transistors are each a p-type transistor;
the third and fourth transistors are each an n-type transistor; and
the second power supply voltage has a higher potential than that of first power supply voltage.

8. The display device according to claim 5, wherein the first through fourth transistors each include a semiconductor layer formed of a polycrystalline silicon film.

9. The display device according to claim 5, wherein the first through fourth transistors each include a semiconductor layer formed of an amorphous silicon film.

10. A display device, comprising:
a plurality of pixel areas each including a mechanical shutter, wherein an amount of light transmitted by each pixel area is based on the position of the mechanical shutter of the pixel area over an opening within the pixel area through which light can pass;
a signal line for inputting an image signal to each of the pixel areas;
a scanning line for inputting a scanning voltage to each of the pixel areas;
a first power supply line to be supplied with a first power supply voltage;
a second power supply line to be supplied with a second power supply voltage;
a shutter voltage line connected to the mechanical shutter and to be supplied with a shutter control voltage;
a reset line to be supplied with a reset voltage; and
a control line to be supplied with a control voltage;
wherein:
the display device electrically controls the position of the mechanical shutter to provide image display;
each of the pixel areas includes a pixel circuit for electrically controlling the position of the mechanical shutter;
the pixel circuit includes:
a first control electrode and a second control electrode provided as a pair with respect to the mechanical shutter;
an input transistor which includes a current terminal having one end connected to the signal line, the input transistor having a gate connected to the scanning line;
a storage capacitor having one end connected to the other end of the current terminal of the input transistor and having the other end connected to the shutter voltage line, the storage capacitor storing a voltage received by the input transistor;
a first transistor of a first conductivity type which includes a current terminal having one end connected to the second power supply line and the other end connected to the first control electrode, the first transistor having a gate connected to the reset line; and
a second transistor of a second conductivity type which includes a current terminal having one end connected to the first power supply line and the other end connected to the first control electrode, the second transistor having a gate to which the voltage stored by the storage capacitor is input; and wherein the second control electrode is connected to the control line;
wherein a voltage level of the shutter control voltage is changed at a prescribed timing, based on image data for an image frame, to position the mechanical shutter in contact with the first control electrode such that the mechanical shutter blocks the opening in the pixel area or to position the mechanical shutter in contact with the second control electrode such that the mechanical shutter does not block the opening in the pixel area, and wherein at about the beginning of a time period extending from a time when the mechanical shutter comes to a stop to a time when image data for a subsequent image frame is loaded in the pixel circuit, a potential difference between the mechanical shutter and the first control electrode or the second control electrode which is in contact with the mechanical shutter is decreased while maintaining the mechanical shutter in contact with the first control electrode or the second control electrode.

11. The display device according to claim 10, further comprising:
a third transistor of the first conductivity type which is connected between the first transistor and the first control electrode; and
a fourth transistor of the second conductivity type which is connected between the second transistor and the first control electrode;
wherein a gate of the third transistor and a gate of the fourth transistor are to be supplied with a prescribed voltage.

12. A display device, comprising a plurality of pixel areas each including a mechanical shutter, wherein an amount of light transmitted by each pixel area is based on the position of the mechanical shutter of the pixel area over an opening within the pixel area through which light can pass, the display device electrically controlling the position of the mechanical shutter relative to the opening to provide image display, wherein:
each of the pixel areas includes a pixel circuit for electrically controlling the position of the mechanical shutter; and
the pixel circuit includes:
a first control electrode and a second control electrode provided as a pair with respect to the mechanical shutter;
a first means for applying, based on image data for an image frame, a prescribed control voltage to the first control electrode and the second control electrode to position the mechanical shutter in contact with the first control electrode such that the mechanical shutter blocks the opening in the pixel area or to position the mechanical shutter in contact with the second control electrode such that the mechanical shutter does not block the opening in the pixel area; and
a second means for, at about the beginning of a time period extending from a time when the mechanical shutter comes to a stop to a time when image data for a subsequent image frame is loaded in the pixel circuit, decreasing a potential difference between the mechanical shutter and the second control electrode which is in contact with the mechanical shutter while maintaining the mechanical shutter in contact with the second control electrode.

13. A display device, comprising:
a plurality of pixel areas each including a mechanical shutter, wherein an amount of light transmitted by each pixel area is based on the position of the mechanical shutter of the pixel area over an opening within the pixel area through which light can pass;
a signal line for inputting an image signal to each of the pixel areas;
a scanning line for inputting a scanning voltage to each of the pixel areas;
a first power supply line to be supplied with a first power supply voltage;
a second power supply line to be supplied with a second power supply voltage; and
a shutter voltage line connected to the mechanical shutter and to be supplied with a shutter control voltage;
wherein:
the display device electrically controls the position of the mechanical shutter to provide image display;
each of the pixel areas includes a pixel circuit for electrically controlling the position of the mechanical shutter;
the pixel circuit includes:
 a first control electrode and a second control electrode provided as a pair with respect to the mechanical shutter;
 an input transistor which includes a current terminal having one end connected to the signal line, the input transistor having a gate connected to the scanning line;
 a storage capacitor having one end connected to the other end of the current terminal of the input transistor and having the other end connected to the first power supply line, the storage capacitor storing a voltage received by the input transistor;
 a first transistor of a first conductivity type which includes a current terminal having one end connected to the second power supply line and the other end connected to the second control electrode, the first transistor having a gate to which the voltage stored by the storage capacitor is input;
 a second transistor of the first conductivity type which includes a current terminal having one end connected to the second power supply line and the other end connected to the first control electrode, the second transistor having a gate connected to the second control electrode;
 a third transistor of a second conductivity type which includes a current terminal having one end connected to the first power supply line and the other end connected to the second control electrode, the third transistor having a gate to which the voltage stored by the storage capacitor is input; and
 a fourth transistor of the second conductivity type which includes a current terminal having one end connected to the first power supply line and the other end connected to the first control electrode, the fourth transistor having a gate connected to the second control electrode;
 wherein a voltage level of the first power supply voltage or a voltage level of the second power supply voltage is changed at a prescribed timing, based on image data for an image frame, to position the mechanical shutter in contact with the first control electrode such that the mechanical shutter blocks the opening in the pixel area or to position the mechanical shutter in contact with the second control electrode such that the mechanical shutter does not block the opening in the pixel area, and wherein at about the beginning of a time period extending from a time when the mechanical shutter comes to a stop to a time when image data for a subsequent image frame is loaded in the pixel circuit, a potential difference between the mechanical shutter and the first control electrode or the second control electrode which is in contact with the mechanical shutter is decreased while maintaining the mechanical shutter in contact with the first control electrode or the second control electrode.

14. A display device, comprising:
a plurality of pixel areas each including a mechanical shutter, wherein an amount of light transmitted by each pixel area is based on the position of the mechanical shutter of the pixel area over an opening within the pixel area through which light can pass;
a signal line for inputting an image signal to each of the pixel areas;
a scanning line for inputting a scanning voltage to each of the pixel areas;
a first power supply line to be supplied with a first power supply voltage;
a second power supply line to be supplied with a second power supply voltage;
a shutter voltage line connected to the mechanical shutter and to be supplied with a shutter control voltage;
a reset line to be supplied with a reset voltage; and
a control line to be supplied with a control voltage;
wherein:
the display device electrically controls the position of the mechanical shutter to provide image display;
each of the pixel areas includes a pixel circuit for electrically controlling the position of the mechanical shutter;
the pixel circuit includes:
 a first control electrode and a second control electrode provided as a pair with respect to the mechanical shutter;
 an input transistor which includes a current terminal having one end connected to the signal line, the input transistor having a gate connected to the scanning line;
 a storage capacitor having one end connected to the other end of the current terminal of the input transistor and having the other end connected to the shutter voltage line, the storage capacitor storing a voltage received by the input transistor;
 a first transistor of a first conductivity type which includes a current terminal having one end connected to the second power supply line and the other end connected to the first control electrode, the first transistor having a gate connected to the reset line; and
 a second transistor of a second conductivity type which includes a current terminal having one end connected to the first power supply line and the other end connected to the first control electrode, the second transistor having a gate to which the voltage stored by the storage capacitor is input; and the second control electrode is connected to the control line;
 wherein a voltage level of the shutter control voltage is changed at a prescribed timing, in response to image data for an image frame, to position the mechanical shutter in contact with the first control electrode such that the mechanical shutter blocks the opening in the pixel area or to position the mechanical shutter in contact with the second control electrode such that the mechanical shutter does not block the opening in the pixel area, and wherein at about the beginning of a time period extending from a time when the mechanical shutter comes to a stop to a time when image data for a subsequent image frame is loaded in the pixel circuit, a potential difference between the mechanical shutter and the second control electrode which is in contact with the mechanical shutter is decreased while maintaining the mechanical shutter in contact with the second control electrode.

15. A method for driving a display device, the display device including:
a plurality of pixel_areas each including a mechanical shutter, wherein an amount of light transmitted by each pixel area is based on the position of the mechanical shutter of the pixel area over an opening within the pixel area through which light can pass; each of the pixel areas includes a pixel circuit for electrically controlling the position of the mechanical shutter; the pixel circuit includes a first control electrode and a second control electrode provided as a pair with respect to the mechanical shutter; and the display device electrically controls the position of the mechanical shutter to provide image display,
the driving method comprising:
applying, based on image data for an image frame, a prescribed control voltage to the first control electrode and the second control electrode to position the mechanical shutter in contact with the first control electrode such that the mechanical shutter blocks the opening in the pixel area or to position the mechanical shutter in contact with the second control electrode such that the mechanical shutter does not block the opening in the pixel area; and
at about the beginning of a time period extending from a time when the mechanical shutter comes to a stop to a time when image data for a subsequent image frame is loaded in the pixel circuit, decreasing a potential difference between the mechanical shutter and the first control electrode or the second control electrode which is in contact with the mechanical shutter while maintaining the mechanical shutter in contact with the first control electrode or the second control electrode.

16. A method for driving a display device, the display device including:
a plurality of pixel areas each including a mechanical shutter, wherein an amount of light transmitted by each pixel area is based on the position of the mechanical shutter of the pixel area over an opening within the pixel area through which light can pass; each of the pixel areas includes a pixel circuit for electrically controlling the position of the mechanical shutter; the pixel circuit includes a first control electrode and a second control electrode provided as a pair with respect to the mechanical shutter; and the display device electrically controls the position of the mechanical shutter to provide image display,
the driving method comprising:
applying, based on image data for an image frame, a prescribed control voltage to the first control electrode and the second control electrode to position the mechanical shutter in contact with the first control electrode such that the mechanical shutter blocks the opening in the pixel area or to position the mechanical shutter in contact with the second control electrode such that the mechanical shutter does not block the opening in the pixel area; and
at about the beginning of a time period extending from a time when the mechanical shutter comes to a stop to a time when image data for a subsequent image frame is loaded in the pixel circuit, decreasing a potential difference between the mechanical shutter and the second control electrode which is in contact with the mechanical shutter while maintaining the mechanical shutter in contact with the second control electrode.

* * * * *